United States Patent
Maeda

(10) Patent No.: US 7,533,249 B2
(45) Date of Patent: May 12, 2009

(54) RECONFIGURABLE INTEGRATED CIRCUIT, CIRCUIT RECONFIGURATION METHOD AND CIRCUIT RECONFIGURATION APPARATUS

(75) Inventor: Masaki Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 45 days.

(21) Appl. No.: 11/877,244

(22) Filed: Oct. 23, 2007

(65) Prior Publication Data

US 2008/0098211 A1 Apr. 24, 2008

(30) Foreign Application Priority Data

Oct. 24, 2006 (JP) ............... 2006-288579

(51) Int. Cl.
*G06F 7/38* (2006.01)
*G06F 9/00* (2006.01)
*G06F 9/44* (2006.01)

(52) U.S. Cl. .............. 712/221; 714/722; 713/100; 326/38; 326/39

(58) Field of Classification Search ............ 326/38–39; 714/722; 713/100; 712/221
See application file for complete search history.

(56) References Cited

U.S. PATENT DOCUMENTS 6,157,210 A * 12/2000 Zaveri et al. ................ 326/40
7,194,610 B2 * 3/2007 Uriu et al. ................... 712/241
7,418,579 B2 * 8/2008 Guibert et al. .............. 712/226

FOREIGN PATENT DOCUMENTS

JP 2004-505488 2/2004
WO 02/09287 1/2002

* cited by examiner

*Primary Examiner*—Rexford Barnie
*Assistant Examiner*—Jason Crawford
(74) *Attorney, Agent, or Firm*—Wenderoth, Lind & Ponack, L.L.P.

(57) ABSTRACT

In order to reuse configuration information in a dynamic reconfiguration arithmetic circuit, data lines, address lines, a mask register and the like are required as hardware resources for rewriting only configuration information of dynamic reconfiguration arithmetic cells needed to be changed. However, this results in an increase in area of the arithmetic circuit. According to the present invention, a shift register is the only hardware resource in the dynamic reconfiguration arithmetic block for changing the configuration information. The shift register is structured by connecting in series storage units corresponding one-to-one with each arithmetic cell. An output from the end terminal of the shift register and an output of the configuration information storage unit are input to the configuration information selector, and an output of the configuration information selector is connected to the front of the shift register. The cell address counter counts up from 0 and increments one at a time. Only when the count value is equal to a cell address for configuration change, the configuration information selector selects the configuration information storage unit; otherwise, the configuration information selector reuses configuration information output from the end terminal of the shift register.

18 Claims, 16 Drawing Sheets

FIG. 4

| ARITHMETIC CELLS WHOSE CONFIGURATIONS ARE CHANGED AT CHANGE FROM CONFIGURATION A TO CONFIGURATION B | ARITHMETIC CELLS WHOSE CONFIGURATIONS ARE CHANGED AT CHANGE FROM CONFIGURATION B TO CONFIGURATION C | ARITHMETIC CELLS WHOSE CONFIGURATIONS ARE CHANGED AT CHANGE FROM CONFIGURATION C TO CONFIGURATION A |
|---|---|---|
| 10 | 10 | 11 |
| 11 | 11 | 12 |
|  | 12 |  |

FIG. 5

| | CONFIGURATION A | CONFIGURATION B | CONFIGURATION C | REMARKS |
|---|---|---|---|---|
| ARITHMETIC CELL 2100-01 | 5000 | 5000 | 5000 | NO CHANGE |
| ARITHMETIC CELL 2100-02 | 0010 | 0010 | 0010 | NO CHANGE |
| ARITHMETIC CELL 2100-03 | 435 | 435 | 435 | NO CHANGE |
| ARITHMETIC CELL 2100-04 | 3113 | 3113 | 3113 | NO CHANGE |
| ARITHMETIC CELL 2100-05 | 1536 | 1536 | 1536 | NO CHANGE |
| ARITHMETIC CELL 2100-06 | 5120 | 5120 | 5120 | NO CHANGE |
| ARITHMETIC CELL 2100-07 | 2345 | 2345 | 2345 | NO CHANGE |
| ARITHMETIC CELL 2100-08 | 201 | 201 | 201 | NO CHANGE |
| ARITHMETIC CELL 2100-09 | 4536 | 4536 | 4536 | NO CHANGE |
| ARITHMETIC CELL 2100-10 | 3333 | 2315 | 3333 | SAME IN CONFIGURATIONS A & C |
| ARITHMETIC CELL 2100-11 | 5678 | 5778 | 5889 | DIFFERENT IN ALL CONFIGURATIONS |
| ARITHMETIC CELL 2100-12 | 4500 | 4500 | 4300 | SAME IN CONFIGURATIONS A & B |
| ARITHMETIC CELL 2100-13 | 7843 | 7843 | 7843 | NO CHANGE |
| ARITHMETIC CELL 2100-14 | 1111 | 1111 | 1111 | NO CHANGE |
| ARITHMETIC CELL 2100-15 | 7632 | 7632 | 7632 | NO CHANGE |
| ARITHMETIC CELL 2100-16 | 2222 | 2222 | 2222 | NO CHANGE |

FIG. 11

CALCULATION FORMULA FOR
FILTERING IN HORIZONTAL DIRECTION 1

$X_2' = (1*X_1 + 1*X_3)/2$ $X_1$: DATA OF PIXEL TO IMMEDIATE LEFT OF $X_2$
$X_2$: DATA OF PIXEL FOR CORRECTION
$X_3$: DATA OF PIXEL TO IMMEDIATE RIGHT OF $X_2$
$X_2'$: NEW DATA OF PIXEL $X_2$

FIG. 12

CALCULATION FORMULA FOR
FILTERING IN HORIZONTAL DIRECTION 2

$X_2' = (1*X_1 + 2*X_2 + 1*X_3)/4$ $X_1$: DATA OF PIXEL TO IMMEDIATE LEFT OF $X_2$
$X_2$: DATA OF PIXEL FOR CORRECTION
$X_3$: DATA OF PIXEL TO IMMEDIATE RIGHT OF $X_2$
$X_2'$: NEW DATA OF PIXEL $X_2$

US 7,533,249 B2

RECONFIGURABLE INTEGRATED CIRCUIT, CIRCUIT RECONFIGURATION METHOD AND CIRCUIT RECONFIGURATION APPARATUS

This application is based on application No. 2006-288579 filed in Japan, the contents of which are hereby incorporated by reference.

BACKGROUND OF THE INVENTION

[1] Field of the Invention

The present invention relates to a dynamic reconfigurable arithmetic circuit capable of dynamically changing a logical configuration, especially to hardware resources required for changing the configuration of the dynamic reconfigurable arithmetic circuit.

[2] Description of the Related Art

In late years, a dynamic reconfigurable arithmetic circuit (generally referred to as "dynamic reconfigurable logic") capable of changing its logical configuration according to a program has been proposed for the purpose of enabling both flexibility in software processing and high-speed capability of hardware processing.

As of now, FPGA (Field Programmable Gate Array) and PLD (Programmable Logic Device) are well known as devices whose logical configuration can be changed according to a program. FPGAs and PLDs are capable of changing, for example, connections between internal transistors dynamically to some extent in accordance with a program, to thereby restructure a circuit having a different function on the whole.

However, simple FPGAs and PLDs require many hardware resources for changing the configuration, resulting in an increase in area. Hardware resources required for changing the configuration are, specifically speaking, a storage unit for storing configuration information that defines the configuration of FPGA and the like, and a wiring group for appropriately distributing configuration information to each reconfiguration element, for example.

[Patent Reference 1] Published Japanese Translation of PCT International Publication for Patent Applications 2004-505488

SUMMARY OF THE INVENTION

The present invention aims at providing a circuit reconfiguration apparatus, a circuit reconfiguration method, and an integrated circuit, all of which are capable of reducing, within a dynamic reconfiguration arithmetic circuit, an area occupied by hardware resources required for configuration change.

In order to achieve the objective, the present invention is an integrated circuit capable of changing an internal configuration thereof, comprising: a reconfiguration arithmetic block (i) including a plurality of reconfigurable arithmetic cells and a plurality of cell storage units each of which corresponds to a different one of the arithmetic cells and stores therein a piece of original configuration information indicating all or part of a configuration of the corresponding arithmetic cell, (ii) outputting an output set including therein pieces of original configuration information stored in the cell storage units, (iii) receiving an input set including therein one or some of the pieces of original configuration information included in the output set and one or more pieces of alternative configuration information, each of which is to replace a corresponding one of remaining pieces of original configuration information included in the output set and indicates all or part of a new configuration of a corresponding arithmetic cell whose configuration needs to be changed, and (iv) reconfiguring the arithmetic cells according to the one or some of the pieces of original configuration information and the one or more pieces of alternative configuration information included in the received input set; a storage unit storing therein the one or more pieces of alternative configuration information; and a control unit operable to (i) control the reconfiguration arithmetic block to obtain the output set therefrom, (ii) for each arithmetic cell whose configuration needs not to be changed, select a corresponding piece of original configuration information from the output set, and for each arithmetic cell whose configuration needs to be changed, select a corresponding piece of alternative configuration information stored in the storage unit in place of the corresponding piece of original configuration information in the output set, and (iii) output, to the reconfiguration arithmetic block, the input set in which the one or some of the pieces of original configuration information are the selected pieces of original configuration information and the one or more pieces of alternative configuration information are the selected pieces of alternative configuration information.

Here, the "reconfiguration arithmetic block" above corresponds to a dynamic reconfiguration arithmetic block 2010 shown in FIG. 1 of Embodiment 1. In addition, the function of the "storage unit" is fulfilled by a configuration information storage unit 3000 of Embodiment 1. The function of the "control unit" is fulfilled by a configuration information selector 3400, a cell address comparator 4000, a cell address counter 5000, a reconfiguration cell address storage unit 6000 and a storage unit address counter 8000.

According to the structure, the control unit (i) selects a piece of alternative configuration information for each of the arithmetic cells whose configuration needs to be changed while selecting a piece of original configuration information for each of the arithmetic cells whose configuration needs not to be changed, and (ii) outputs an output set made up of the selected pieces of alternative and original configuration information. The reconfiguration arithmetic block reconfigures each arithmetic cell according to the pieces of the original and alternative configuration information included in the output set.

Therefore, in the case of changing the configuration of the reconfiguration arithmetic block, the storage unit only has to store pieces of alternative configuration information corresponding to arithmetic cells whose configuration needs to be changed. Accordingly, a reduction in the capacity of the storage unit can be realized.

Further, in the present invention, the control unit may repeat (i) outputting a timing signal to the reconfiguration arithmetic block, (ii) obtaining apiece of original configuration information included in the output set, and (iii) selecting one of the obtained piece of original configuration information and a piece of alternative configuration information based on whether the obtained piece of original configuration information corresponds to an arithmetic cell whose configuration needs to be changed and outputting the selected piece to the reconfiguration arithmetic block. Further, the arithmetic cells may be respectively connected to the corresponding cell storage units. Here, the cell storage units are connected in series together to form a shift register. At each time when the timing signal is received from the control unit, (i) a cell storage unit located at a last end of the shift register outputs the piece of original configuration information stored therein, (ii) each of remaining storage units other than the cell storage unit located at the last end shifts the piece of original configuration information or a piece of alternative information, whichever is stored therein, to a neighboring cell storage unit in a direction of the last end, and (iii) a cell storage unit located at a first end of the shift register stores therein a piece of original configuration information included in the output set or a piece of alternative configuration information.

The above-mentioned Patent Reference 1 discloses a technology for reducing the capacity of the storage unit required for changing the configuration of the reconfiguration arithmetic block. According to the technology, the reconfiguration arithmetic block includes therein a shift register for transmitting configuration data, data lines for transmitting configuration data in the direction perpendicular to the shift register, and a mask register for preventing new configuration information (which corresponds to alternative configuration information of the present invention) from being transmitted to arithmetic cells whose configuration will not be changed. One data line is provided for each row while one mask register is provided for each column. Therefore, if the reconfiguration arithmetic block increases in size, the area occupied by the data lines and mask registers also increases.

In comparison, according to the integrated circuit of the present invention, a piece of original configuration information is output to the control unit from the cell storage unit located at the last end of the shift register in response to the timing signal functioning as a trigger. Each of the remaining cell storage units shifts a piece of original configuration information or a piece of alternative information, whichever is stored therein, and the cell storage unit located at the first end of the shift register stores therein a piece of original configuration information or a piece of alternative configuration information output from the control unit.

That is, within the reconfiguration arithmetic block, the shift register is the only component relating to configuration change. In addition, the circuit size of the control unit is substantially not influenced by the size of the reconfiguration arithmetic block. Accordingly, when the size of the reconfiguration arithmetic block increases—i.e. when the total number of arithmetic cells increases, the shift register is the only component whose area increases. Therefore, in comparison to the above-mentioned patent reference, the present invention is able to inhibit an increase in the total area of the circuit associated with size expansion of the reconfiguration arithmetic block.

In the present invention, the arithmetic cells may be respectively identified by different identification numbers that are assigned serially in an order of the corresponding arithmetic cells being connected to the shift register. Here, the control unit (i) stores therein at least one reconfiguration target identification number which indicates an arithmetic cell whose configuration needs to be changed, (ii) holds a counter value, (iii) repeatedly outputs the timing signal, and (iv) performs repetition of, for each output of the timing signal, adding a constant value to the holding counter value, making a comparison between the added counter value and the reconfiguration target identification number, and selecting the piece of alternative configuration information when the comparison shows agreement and selecting the output piece of original configuration information when the comparison shows disagreement.

According to the structure, each of the arithmetic cells is identified by a different identification number. Here, the control unit compares the added counter value against the stored reconfiguration target identification number, and selects the piece of alternative configuration information when the comparison shows agreement and selects the output piece of original configuration information when the comparison shows disagreement.

Therefore, according to the present invention, the control unit is able to make such a selection by a simple process, comparison.

In the present invention, the control unit may include: a reconfiguration cell address storage unit sequentially storing therein the at least one reconfiguration target identification number, a cell address counter operable holding the counter value and operable to repeatedly output the timing signal and add the constant value to the counter value at each output of the timing signal, an address counter operable to determine a read address in the storage unit and in the reconfiguration cell address storage unit; a cell address comparison unit operable to make a comparison, at each time when the timing signal is output, between the added counter value and an identification number stored at the determined read address in the reconfiguration cell address storage unit; and an information selection unit operable to repeat, for each comparison, (i) selecting the piece of alternative configuration information stored at a location indicated by the determined read address in the storage unit when the comparison shows agreement and selecting the output piece of original configuration information when the comparison shows disagreement, and (ii) outputting the selected piece to the cell storage unit located at the first end. Here, the storage unit stores therein at least one piece of alternative configuration information in association with at least one piece of reconfiguration target identification number.

According to the structure, the control unit can be realized by combining simple circuits, such as a counter, a comparator and an adder.

In the present invention, when the comparison made by the cell address comparison unit shows agreement, the address counter may set, as a new read address, a value obtained by adding 1 to the read address.

According to the structure, the address counter is able to update the read address by a simple arithmetic operation, addition.

In the present invention, the address counter may store therein an initial address of the reconfiguration cell address storage unit, externally obtain a reconfiguration instruction requesting reconfiguration of the reconfiguration arithmetic block, and set the initial address as the read address when obtaining the reconfiguration instruction.

Since storing therein the initial address of the reconfiguration cell address storage unit, the address counter is able to quickly determine an initial read address when receiving the reconfiguration instruction.

In the present invention, the address counter may store an end address of the reconfiguration cell address storage unit, and stop adding 1 to the read address when the read address is equal to the end address.

According to the structure, the address counter stops updating the read address when the read address is equal to the end address. The cell address storage unit may be realized by a region within a large capacity memory.

According to the structure, since the address counter stops updating the read address when the read address is equal to the end address, data is not referred to if it has no relevance to configuration change. Accordingly, the integrated circuit of the present invention is capable of reconfiguring the reconfiguration arithmetic block in a reliable manner.

In the present invention, the control unit may stop the repetition when the counter value is equal to an identification number which indicates an arithmetic cell corresponding to the cell storage unit located at the first end.

According to the structure, the control unit stops the repetition when the counter value is equal to the identification number which indicates an arithmetic cell corresponding to the cell storage unit located at the first end. Therefore, for each cell storage unit corresponding to an arithmetic cell whose configuration is not to be changed, a piece of original configuration information originally stored therein before the configuration change is started is returned; for each cell storage unit corresponding to an arithmetic cell whose configuration needs to be changed, a piece of alternative configuration information is stored therein. Thus, the present invention is capable of completing the configuration change of the reconfiguration arithmetic block in a reliable manner.

In the present invention, each of the cell storage units may store therein, as the piece of original configuration information, an original arithmetic parameter indicating part of the configuration of the corresponding arithmetic cell. Here, the storage unit stores therein, as the piece of alternative configuration information, an alternative arithmetic parameter indicating part of the configuration of the corresponding arithmetic cell. The reconfiguration arithmetic block rewrites an arithmetic parameter configuring each of the arithmetic cells according to one of the original arithmetic parameter included in the input set and the alternative arithmetic parameter.

According to the structure, within the information indicating the configuration of each arithmetic cell, only the arithmetic parameter is changed. This results in a further reduction in the storage capacity of the storage unit.

In the present invention, the reconfiguration arithmetic block and the control unit may be connected by a $1^{st}$ wiring and a $2^{nd}$ wiring, and the storage unit and the control unit are connected by a $3^{rd}$ wiring. Here, the reconfiguration arithmetic block outputs the output set to the control unit via the $1^{st}$ wiring. The control unit obtains the output set via the $1^{st}$ wiring, obtains the one or more pieces of alternative configuration information via the $3^{rd}$ wiring, and outputs the input set to the reconfiguration arithmetic block via the $2^{nd}$ wiring. Further, the present invention may be an image processing apparatus having thereon the above-mentioned integrated circuit and causing the circuit reconfiguration apparatus to reconfigure the reconfiguration arithmetic block during one of a vertical blanking period and a horizontal blanking period. Further, the present invention may be an information processing apparatus having thereon the above-mentioned integrated circuit and causing the circuit reconfiguration apparatus to reconfigure the reconfiguration arithmetic block during a period in which a process by a circuit established on the reconfiguration arithmetic block does not have to be performed.

According to the structure, an apparatus having thereon the integrated circuit is able to make efficient use of time for changing the configuration of the reconfiguration arithmetic block.

The present invention may be an integrated circuit capable of changing an internal configuration thereof, comprising: a reconfiguration arithmetic block (i) including a plurality of reconfigurable arithmetic cells and a plurality of cell storage units each of which corresponds to a different one of the arithmetic cells and stores therein a piece of original configuration information indicating all or part of a configuration of the corresponding arithmetic cell, (ii) outputting an output set including therein pieces of original configuration information stored in the cell storage units, (iii) receiving an input set including therein one or some of the pieces of original configuration information included in the output set and one or more pieces of alternative configuration information, each of which is to replace a corresponding one of remaining pieces of original configuration information included in the output set and indicates all or part of a new configuration of a corresponding arithmetic cell whose configuration needs to be changed, and (iv) reconfiguring the arithmetic cells according to the one or some of the pieces of original configuration information and the one or more pieces of alternative configuration information included in the received input set; an obtaining unit operable to obtain the one or more pieces of alternative configuration information; and a control unit operable to (i) control the reconfiguration arithmetic block to obtain the output set therefrom, (ii) for each arithmetic cell whose configuration needs not to be changed, select a corresponding piece of original configuration information from the output set, and for each arithmetic cell whose configuration needs to be changed, select a corresponding piece of alternative configuration information obtained by the obtaining unit in place of the corresponding piece of original configuration information in the output set, and (iii) output, to the reconfiguration arithmetic block, the input set in which the one or some of the pieces of original configuration information are the selected pieces of original configuration information and the one or more pieces of alternative configuration information are the selected pieces of alternative configuration information. Further, the present invention may be a circuit reconfiguration method used in an integrated circuit capable of changing an internal configuration thereof. Here, the integrated circuit includes: a reconfiguration arithmetic block (i) including a plurality of reconfigurable arithmetic cells and a plurality of cell storage units each of which corresponds to a different one of the arithmetic cells and stores therein a piece of original configuration information indicating all or part of a configuration of the corresponding arithmetic cell, (ii) outputting an output set including therein pieces of original configuration information stored in the cell storage units, (iii) receiving an input set including therein one or some of the pieces of original configuration information included in the output set and one or more pieces of alternative configuration information, each of which is to replace a corresponding one of remaining pieces of original configuration information included in the output set and indicates all or part of a new configuration of a corresponding arithmetic cell whose configuration needs to be changed, and (iv) reconfiguring the arithmetic cells according to the one or some of the pieces of original configuration information and the one or more pieces of alternative configuration information included in the received input set. The circuit reconfiguration method includes: an obtaining step of obtaining the one or more pieces of alternative configuration information; and a control step of (i) controlling the reconfiguration arithmetic block to obtain the output set therefrom, (ii) for each arithmetic cell whose configuration needs not to be changed, selecting a corresponding piece of original configuration information from the output set, and for each arithmetic cell whose configuration needs to be changed, selecting a corresponding piece of alternative configuration information obtained in the obtaining step in place of the corresponding piece of original configuration information in the output set, and (iii) outputting, to the reconfiguration arithmetic block, the input set in which the one or some of the pieces of original configuration information are the selected pieces of original configuration information and the one or more pieces of alternative configuration information are the selected pieces of alternative configuration information. Further, the present invention may be a circuit reconfiguration apparatus comprising: a reconfiguration arithmetic block (i) including a plurality of reconfigurable arithmetic cells and a plurality of cell storage units each of which corresponds to a different one of the arithmetic cells and stores therein a piece of original configuration information indicating all or part of a configuration of the corresponding arithmetic cell, (ii) outputting an output set including therein pieces of original configuration information stored in the cell storage units, (iii) receiving an input set including therein one or some of the pieces of original configuration information included in the output set and one or more pieces of alternative configuration information, each of which is to replace a corresponding one of remaining pieces of original configuration information included in the output set and indicates all or part of a new configuration of a corresponding arithmetic cell whose configuration needs to be changed, and (iv) reconfiguring the arithmetic cells according to the one or some of the pieces of original configuration information and the one or more pieces of alternative configuration information included in the received input set; an obtaining unit operable to obtain the one or more pieces of alternative configuration information; and a control unit operable to (i) control the reconfiguration arithmetic block to obtain the output set therefrom, (ii) for each arithmetic cell whose configuration needs not to be changed, select a corresponding piece of original configuration information from the output set, and for each arithmetic cell whose configuration needs to be changed, select a corresponding piece of alternative configuration information obtained by the obtaining unit in place of the corresponding piece of original configuration information in the output set, and (iii) output, to the reconfiguration arithmetic block, the input set in which the one or some of the pieces of original configuration information are the selected pieces of original configuration information and the one or more pieces of alternative configuration information are the selected pieces of alternative configuration information.

According to the structure, original configuration information, in the output set, corresponding to arithmetic cells whose configuration needs not to be changed can be reused.

BRIEF DESCRIPTION OF THE DRAWINGS

These and other objects, advantageous effects and features of the invention will become apparent from the following description thereof taken in conjunction with the accompanying drawings which illustrate specific embodiments of the invention. In the drawings:

FIG. 4 shows a list of numbers of operation cells 2100 whose configuration has to be changed according to Embodiment 1 of the present invention;

FIG. 5 shows a list of configuration information data values of the dynamic reconfiguration arithmetic block 2010 in individual configurations according to Embodiment 1 of the present invention;

FIG. 11 shows a calculation formula 1 of a filtering process performed by a video quality enhancing circuit 19000 according to Embodiment 2 of the present invention;

FIG. 12 shows a calculation formula 2 of a filtering process performed by the video quality enhancing circuit 19000 according to Embodiment 2 of the present invention;

DESCRIPTION OF THE PREFERRED EMBODIMENTS

1. Embodiment 1

The following describes Embodiment 1 of the present invention in reference to drawings.

1.1 Structure

Figure 1:
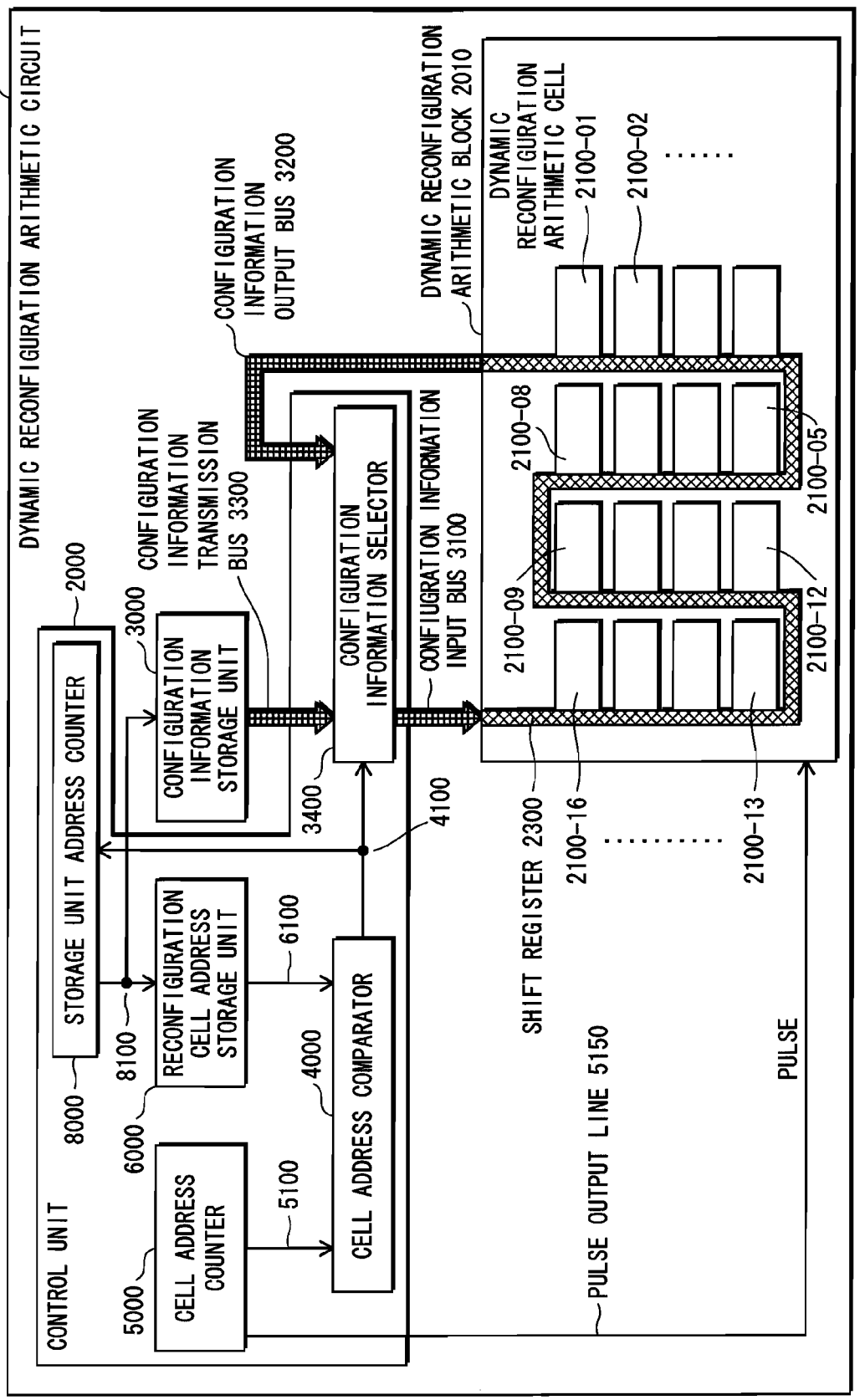
FIG. 1 is a block diagram showing a structure of a dynamic reconfiguration arithmetic circuit 110 according to Embodiment 1 of the present invention.

FIG. 1 is a functional block diagram showing a structure of a dynamic reconfiguration arithmetic circuit 110 according to Embodiment 1 of the present invention.

The circuit is composed of a dynamic reconfiguration arithmetic block 2010, a configuration information storage unit 3000, a configuration information selector 3400, a cell address comparator 4000, a cell address counter 5000, a reconfiguration cell address storage unit 6000, a storage unit address counter 8000, a configuration information input bus 3100, a configuration information output bus 3200, a configuration information transmission bus 3300, a cell address comparator output line 4100, a cell address counter output line 5100, a reconfiguration cell address storage unit output line 6100, and a storage unit address counter output line 8100.

The dynamic reconfiguration arithmetic block 2010 includes sixteen dynamic reconfiguration arithmetic cells 2100-10, 2100-02, 2100-03, . . . , and 2100-16. The type of arithmetic operation performed by each arithmetic cell and a connection configuration for arithmetic operation data can be changed. To the operation cells 2100, cell addresses 16 to 01 are assigned sequentially in descending order from one closest to the input terminal of a shift register 2300. Note that, in the present specification, the dynamic reconfiguration arithmetic cells are sometimes simply referred to as "arithmetic cells" for ease of explanation.

In the following description, the arithmetic cells 2100-01, 2100-02, 2100-03, ..., and 2100-16 are denoted simply as 2100 in the case where they do not have to be particularly distinguished.

Figure 2:
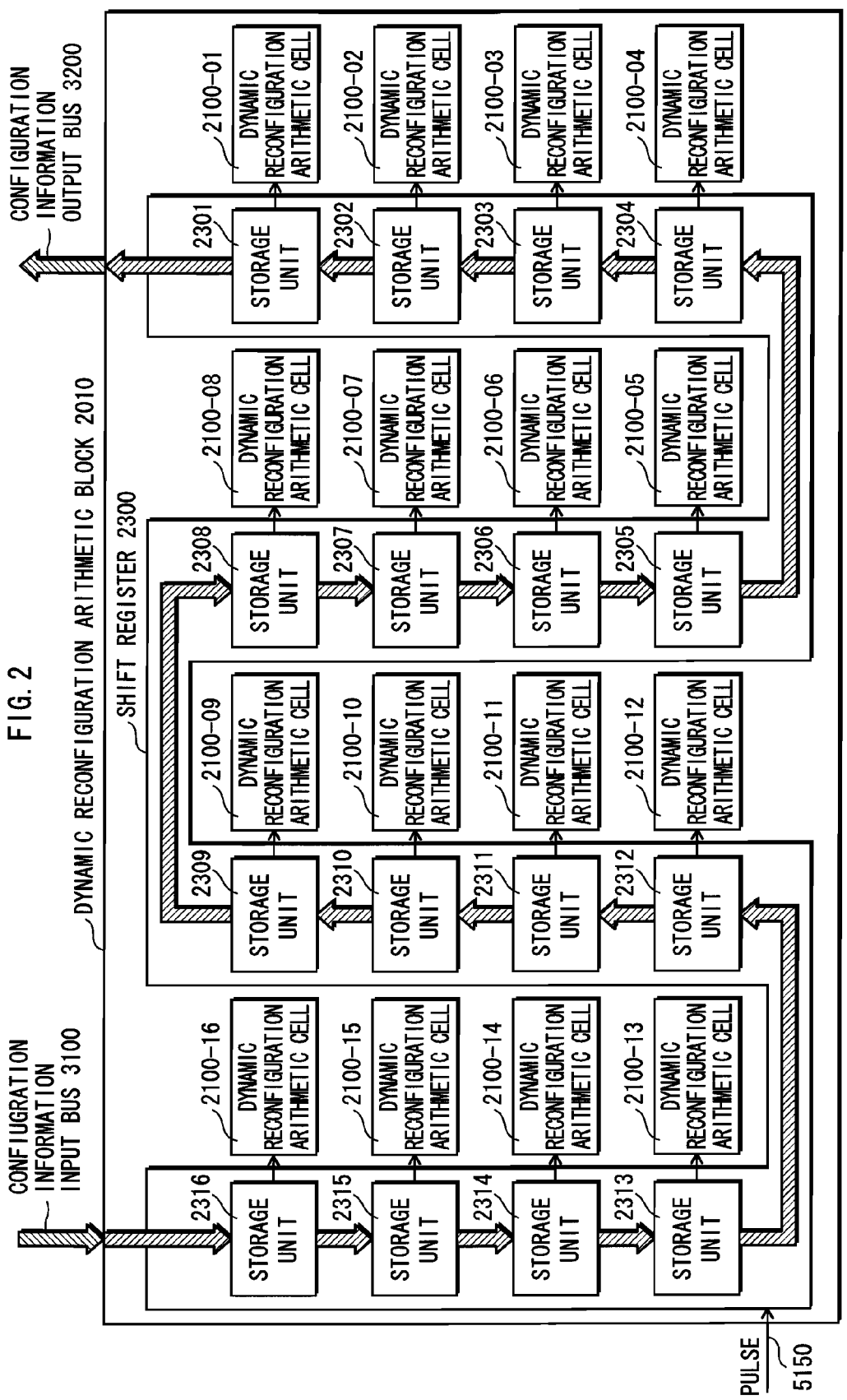
FIG. 2 is a block diagram showing a structure of a shift register 2300 of Embodiment 1 of the present invention.

The next describes details of the shift register 2300 in reference to FIG. 2.

The shift register 2300 includes sixteen storage units 2301, 2302, 2303, 2304, 2305, 2306, 2307, 2308, 2309, 2310, 2311, 2312, 2313, 2314, 2315 and 2316. The storage units are respectively connected to the corresponding arithmetic cells 2100-01, 2100-02, 2100-03, ..., and 2100-16.

Each storage unit stores therein configuration information of a corresponding arithmetic cell. The configuration information includes information regarding the type of arithmetic operation performed by a corresponding arithmetic cell, an arithmetic parameter, and connections between arithmetic cells 2100. For example, the storage unit 2303 corresponding to a cell address 03 stores therein wiring information that indicates to obtain a result of arithmetic operation performed by an arithmetic cell with "cell address 01" and information that indicates to "add" an arithmetic parameter "+3" to the obtained arithmetic result.

The sixteen storage units are cascade-connected in descending order of the cell addresses of the corresponding arithmetic cells 2100 to thereby make up the shift register 2300. In addition, the input terminal of the shift register 2300 is connected to the configuration information input bus 3100, and the output terminal of the shift register 2300 is connected to the configuration information output bus 3200.

In addition, the storage units 2301-2316 making up the shift register 2300 are connected to the cell address counter 5000, and receive a pulse signal from the cell address counter 5000. When receiving the pulse signal, the storage unit 2301 outputs the configuration information stored therein to the configuration information output bus 3200. At the same time, the storage unit 2302 outputs the configuration information stored therein to the storage unit 2301, and the storage unit 2303 outputs the configuration information stored thereinto the storage unit 2302. Each storage unit outputs the configuration information stored in itself to the neighboring storage unit, and thereby the configuration information is sequentially shifted within the shift register 2300. At this time also, configuration information corresponding to one arithmetic cell is input from the configuration information input bus 3100 and then stored in the storage unit 2316.

The following describes a mechanism for inputting configuration information planned to be changed to the shift register 2300 as the configuration of the dynamic reconfiguration arithmetic block 2010 is changed. The configuration information indicating a new configuration of arithmetic cells 2100 planned to be changed is stored in the configuration information storage unit 3000. The change of the configuration of the arithmetic cells 2100 is realized by writing the configuration information stored in the configuration information storage unit 3000 to the shift register 2300.

The configuration information is transmitted to the shift register 2300 via the configuration information selector 3400, the configuration information transmission bus 3300, the configuration information output bus 3200 and the configuration information input bus 3100.

The configuration information output from the configuration information storage unit 3000 is transmitted to the configuration information selector 3400 via the configuration information transmission bus 3300. In addition, the configuration information output from the shift register 2300 is transmitted to the configuration information selector 3400 through the configuration information output bus 3200.

The input terminal of the shift register 2300 is connected to the configuration information input bus 3100, which is connected to the output of the configuration information selector 3400. The configuration information selector 3400 is controlled by the cell address comparator 4000 via the cell address comparator output line 4100.

The cell address comparator 4000 is a function part controlling the configuration information selector 3400 and the storage unit address counter 8000 using its output value.

The cell address comparator 4000 receives an output value (a counter value that will be described later) from the cell address counter 5000 via the cell address counter output line 5100, receives an output value from the reconfiguration cell address storage unit 6000 via the reconfiguration cell address output line 6100, and then compares the received two values. When the two values are equal to each other, the cell address comparator 4000 sets a value output to the cell address comparator output line 4100 to 1; otherwise, the cell address comparator 4000 sets the value to 0.

In the case of outputting 1, the cell address comparator 4000 outputs 1 only during the time period of $\Delta s$, and sets the output value to 0 after the time period As has elapsed. Here, $\Delta s$ is shorter than an interval time $\Delta t$ of counting up by the cell address counter 5000 (the details will be described later with the aid of FIG. 9).

The cell address counter 5000 is initialized to 0 by the storage unit address counter 8000. After the initialization, the cell address counter 5000 counts up the counter value by one at regular intervals ($\Delta t$). The cell address counter 5000 outputs the counter value to the cell address comparator 4000 via the cell address counter output line 5100.

Additionally, the cell address counter 5000 outputs the pulse signal to the shift register 2300 making up the dynamic reconfiguration arithmetic block 2010 at each time of counting up.

The configuration information selector 3400 selects data on the configuration information transmission bus 3300 when the output value of the cell address comparator output line 4100 is 1, and selects data on the configuration information output bus 3200 when the output value of the cell address comparator output line 4100 is 0. Then, the configuration information selector 3400 outputs the selected data to the configuration information input bus 3100.

The configuration information storage unit 3000 stores therein the configuration information of arithmetic cells 2100 planned to be changed in ascending order of the cell addresses. The reconfiguration cell address storage unit 6000 stores therein cell addresses of the arithmetic cells 2100 planned to be changed in ascending order. Within the reconfiguration cell address storage unit 6000 and the configuration information storage unit 3000, each cell address and each piece of configuration information corresponding to the cell address, respectively, are stored in areas identified by the same memory address.

Figure 6:
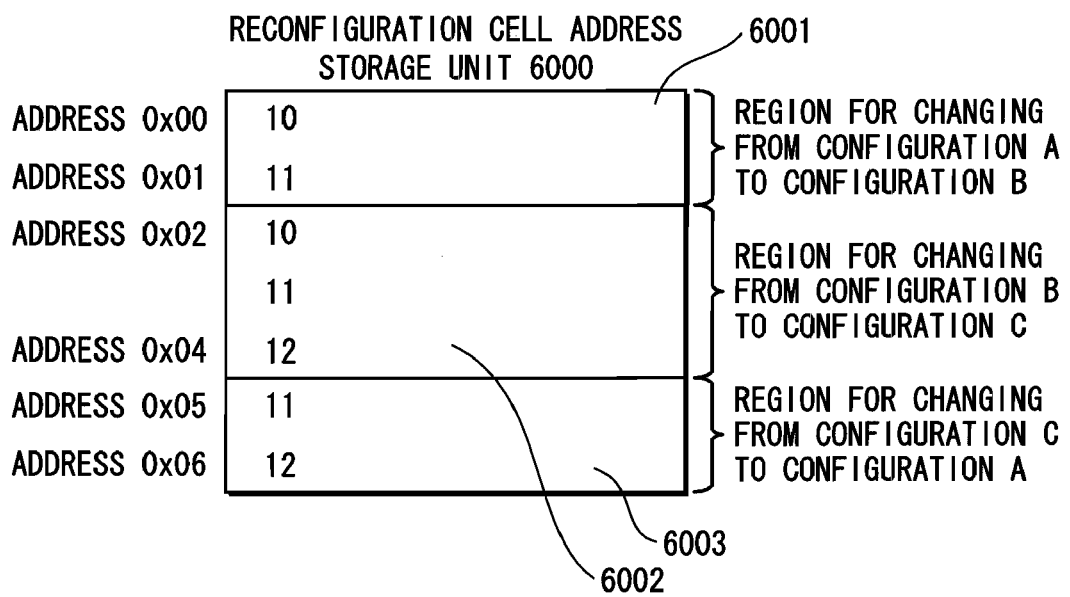
FIG. 6 shows a reconfiguration cell address setting of each configuration area in a reconfiguration cell address storage unit 6000 according to Embodiment 1 of the present invention.
Figure 7:
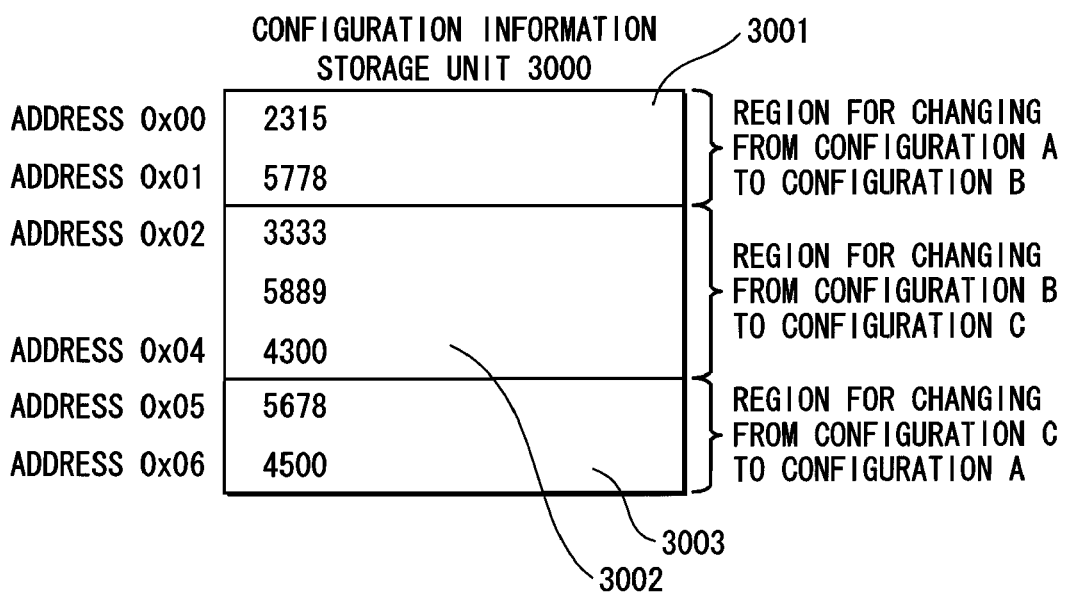
FIG. 7 shows a configuration information data setting of each configuration area in a configuration information storage unit 3000 according to Embodiment 1 of the present invention.

FIGS. 6 and 7 show examples of the structures of the reconfiguration cell address storage unit 6000 and configuration information storage unit 3000, respectively.

For example, in an area 3001/6001 of memory addresses 0×00-0×01 of each storage unit, data for changing the configuration of the dynamic reconfiguration arithmetic block 2010 from Configuration A to Configuration B is stored.

An area 6001 of the reconfiguration cell address storage unit 6000 stores therein cell addresses "10" and "11" of arithmetic cells in ascending order whose configuration information has to be changed in order to change from Configuration A to Configuration B. Specifically speaking, the cell address "10" is stored in the memory address 0x00 and the cell address "11" is stored in the memory address 0x01.

On the other hand, an area 3001 of the configuration information storage unit 3000 stores therein pieces of configuration information required to change from Configuration A to Configuration B in ascending order of the cell addresses corresponding to the respective pieces of the configuration information.

Specifically speaking, in the area of the memory address 0x00, configuration information "2315" of the arithmetic cell 2100-10 identified by the cell address "10" is stored. In the area of the memory address 0x01, configuration information "5778" of the arithmetic cell "11" is stored.

Note that each piece of the configuration information here is expressed in a four-digit decimal number, however, this is merely an example. For instance, the configuration information may be expressed in a 64-bit binary or a 128-bit binary. Or it may be more complicated or simpler configuration information.

The reconfiguration cell address storage unit 6000 and configuration information storage unit 3000 receive an address output from the storage unit address counter 8000 via the storage unit address counter output line 8100. When receiving the address, these storage units 6000 and 3000 respectively read data stored in the received address, and then output each piece of the read data to the reconfiguration cell address output line 6100 and the configuration information transmission bus 3300, respectively.

The storage unit address counter 8000 is a function part controlling addresses to be read by the configuration information storage unit 3000 and the reconfiguration cell address storage unit 6000.

The storage unit address counter 8000 stores therein multiple pairs of initial and end addresses of an area, within the reconfiguration cell address storage unit 6000 and the configuration information storage unit 3000, which stores therein data necessary for changing the configuration of the dynamic reconfiguration arithmetic block 2010.

Specifically speaking, the storage unit address counter 8000 stores therein an initial address "0x00" and an end address "0x01" of the areas 3001 and 6001 in which data necessary for changing the dynamic reconfiguration arithmetic block 2010 from Configuration A to Configuration B is stored. In a similar manner, the storage unit address counter 8000 stores therein an initial address "0x02" and an end address "0x04" of the areas 3002 and 6002 in which data necessary for changing from Configuration B to Configuration C is stored. Also, the storage unit address counter 8000 stores therein an initial address "0x05" and an end address "0x06" of the areas 3003 and 6003 in which data necessary for changing from Configuration C to Configuration A is stored.

The storage unit address counter 8000 receives an instruction for starting configuration change of the dynamic reconfiguration arithmetic block 2010 from a control mechanism of the apparatus having thereon the dynamic reconfiguration arithmetic circuit 110. Here, the received instruction includes information indicating the current configuration of the dynamic reconfiguration arithmetic block 2010 and information indicating a configuration required next. For example, information indicating "change from Configuration A to Configuration B" is included.

Further, the storage unit address counter 8000 may store therein information indicating the current configuration of the dynamic reconfiguration arithmetic block 2010, and the instruction from the control mechanism may include only information indicating the configuration required next.

When receiving the instruction of configuration change, the storage unit address counter 8000 selects a pair of initial and end addresses based on the information indicating the current state of the dynamic reconfiguration arithmetic cells and the configuration required next.

Note that, instead of the storage unit address counter 8000 selecting a pair of initial and end addresses, the instruction from the control mechanism may include therein the initial and end addresses.

Subsequently, the storage unit address counter 8000 outputs the selected initial address to the reconfiguration cell address storage unit 6000 and the configuration information storage unit 3000 via the storage unit address counter output line 8100. The storage unit address counter 8000 also initializes the counter value of the cell address counter 5000 to 0.

In addition, the storage unit address counter 8000 receives 0 and 1 from the cell address comparator output line 4100 in process of the configuration change. When the output value from the cell address comparator output line 4100 is 1, the storage unit address counter 8000 adds 1 to the value output to the storage unit address counter output line 8100. Herewith, the address to be read by the configuration information storage unit 3000 and the reconfiguration cell address storage unit 6000 is changed.

Note however that, even when the output value from the cell address comparator output line 4100 is 1, if the value currently being output to the storage unit address counter output line 8100 is equal to the end address, the storage unit address counter 8000 does not increment the output value.

The configuration change of the dynamic reconfiguration arithmetic block 2010 is described next in detail.

1.2 Time-lapse Configuration Change

Figure 3:
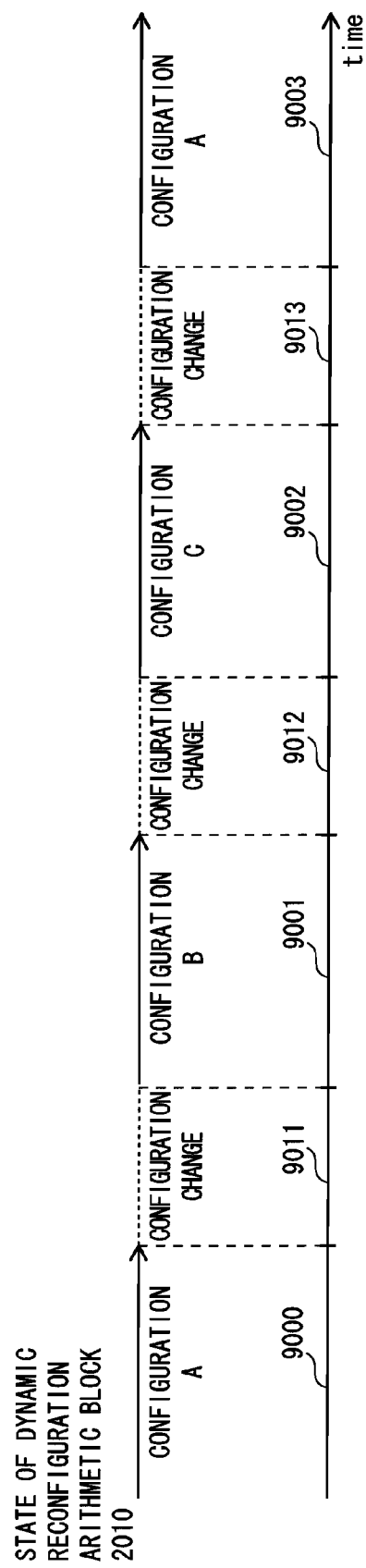
FIG. 3 is an operation scheduling diagram for configuration change in the dynamic reconfiguration arithmetic circuit 110 of Embodiment 1 of the present invention.

FIG. 3 is an operation scheduling diagram of configuration changes of the dynamic reconfiguration arithmetic block 2010 of the present embodiment. The dynamic reconfiguration arithmetic block 2010 is able to change the configuration in the order from Configurations A, B to C. Hereinafter, in drawings, the dynamic reconfiguration arithmetic cells are abbreviated to arithmetic cells, if necessary.

Regarding the changes, a list of cell addresses of the arithmetic cells 2100 whose configuration has to be changed is shown in FIG. 4. Also, FIG. 5 shows a list of data values of configuration information of the dynamic reconfiguration arithmetic cells 2100-01-2100-16 making up the dynamic reconfiguration arithmetic block 2010 for each configuration. In addition, cell address setting values in the reconfiguration cell address storage unit 6000 for each of the configuration changes are shown in FIG. 6. Configuration information data setting values in the configuration information storage unit 3000 for each of the configuration changes are shown in FIG. 7.

The configuration changes are explained in temporal order. In a period 9000, the dynamic reconfiguration arithmetic block 2010 is set in Configuration A. The configuration information of each dynamic reconfiguration arithmetic cell 2100 in Configuration A is as shown in the column of "CONFIGURATION A" of FIG. 5.

Then, in a period 9011, the configuration of the dynamic reconfiguration arithmetic block 2010 is changed from Configuration A to Configuration B. With this change, the configuration information of the dynamic reconfiguration arithmetic cells 2100-10 and 2100-11 is changed.

In a period 9001, the configuration of the dynamic reconfiguration arithmetic block 2010 is in Configuration B. The configuration information of each dynamic reconfiguration arithmetic cell in Configuration B is as shown in the column of "CONFIGURATION B" of FIG. 5.

In a period 9012, the configuration of dynamic reconfiguration arithmetic block 2010 is changed from Configuration B to Configuration C. With this change, the configuration information of the dynamic reconfiguration arithmetic cells 2100-10, 2100-11 and 2100-12 is changed.

In a period 9002, the configuration of the dynamic reconfiguration arithmetic block 2010 is in Configuration C. The configuration information of each dynamic reconfiguration arithmetic cell in Configuration C is as shown in the column of "CONFIGURATION C" of FIG. 5.

Next, in a period 9013, the configuration of the dynamic reconfiguration arithmetic block 2010 is changed from Configuration C to Configuration A. With this change, the configuration information of the dynamic reconfiguration arithmetic cells 2100-11 and 2100-12 is changed.

In the following period 9003, the dynamic reconfiguration arithmetic block 2010 is in Configuration A.

Thus, in the case where the configuration of the dynamic reconfiguration arithmetic block 2010 is cyclically changed from Configurations A, B to C, the configurations of the dynamic reconfiguration arithmetic cells 2100-01, 2100-02, 2100-03, 2100-04, 2100-05, 2100-06, 2100-07, 2100-08, 2100-09, 2100-13, 2100-14, 2100-15 and 2100-16 are not changed. The configurations of only the arithmetic cells 2100-10, 2100-11 and 2100-12 are changed.

Therefore, as shown in FIGS. 6 and 7, only data regarding the arithmetic cells 2100-10, 2100-11 and 2100-12 is stored in the reconfiguration cell address storage unit 6000 and the configuration information storage unit 3000.

1.3 Operation

Figure 8:
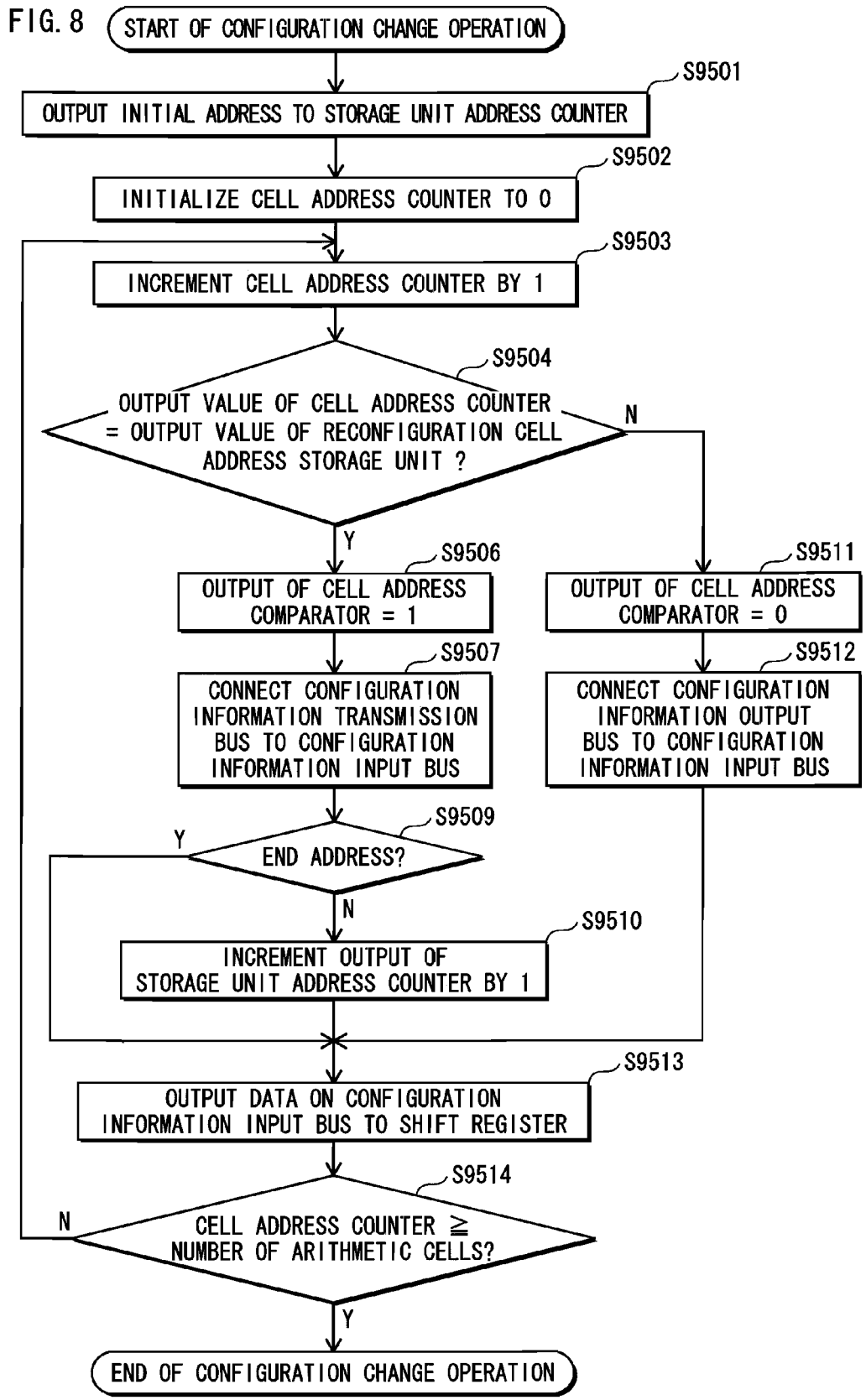
FIG. 8 shows a control flow for configuration change according to Embodiment 1 of the present invention.

FIG. 8 is a flowchart showing operation of the configuration change. The following describes the operation of the configuration change with the aid of FIG. 8.

In the change operation form Configurations A to B in the period 9011, first the storage unit address counter 8000 outputs the initial address "0×00" (Step S9501).

Also, the storage unit address counter 8000 initializes the counter value of the cell address counter 5000 to 0 (Step S9502).

Next, the cell address counter 5000 adds 1 to the counter value (Step S9503).

The cell address comparator 4000 compares the output value of the cell address counter 5000 with that of the reconfiguration cell address storage unit 6000 (Step S9504).

In the result of the comparison, if the two values are equal to each other (S9504: Y) the cell address comparator 4000 outputs 1 during the predetermined time period As (Step S9506).

The configuration information selector 3400 receives 1 via the cell address comparator output line 4100. When receiving 1, the configuration information selector 3400 connects the configuration information transmission bus 3300 to the configuration information input bus 3100 (Step S9507).

Also, the storage unit address counter 8000 after receiving 1 via the cell address comparator output line 4100 compares the data currently being output to the storage unit address counter output line 8100 with an end address corresponding to the initial address output in Step S9501 (Step S9509). When they do not match each other (Step S9509: N), the storage unit address counter 8000 adds 1 to the data being output (Step S9510).

In the result of the comparison, if they match each other (Step S9509: Y), the storage unit address counter 8000 does not perform the increment in Step S9510, and the process moves to Step S9513.

If they do not match each other in Step S9504 (Step S9504: N), the cell address comparator 4000 outputs 0 to the cell address comparator output line 4100 (Step S9511).

The configuration information selector 3400 after receiving 0 connects the configuration information output bus 3200 to the configuration information input bus 3100 (Step S9512).

Subsequently, the configuration data on the configuration information input bus 3100 is input to the shift register 2300 (Step S9513).

Next, the cell address counter 5000 compares the counter value with the number of the dynamic reconfiguration arithmetic cells 2100 (in this case, 16). When the counter value indicates 16 or more (Step S9514: Y), the operation of the configuration change is ended.

If the counter value indicates less than 16 (N in Step S9514), the process returns to Step S9503, and then Steps S9503-S9514 are repeated until the counter value indicates 16 or more.

In the case of the configuration change from Configurations A to B, the configuration information in the dynamic reconfiguration arithmetic cells 2100-01, 2100-02, 2100-03, 2100-04, 2100-05, 2100-06, 2100-07, 2100-08, 2100-09, 2100-12, 2100-13, 2100-14, 2100-15 and 2100-16 whose configuration is not changed is reused in the process depicted by FIG. 8.

The configuration information of only the dynamic reconfiguration arithmetic cells 2100-10 and 2100-11 is changed with that stored in the configuration information storage unit 3000.

In relation to the configuration changes from Configurations B to C and from Configurations C to A, the configuration information of arithmetic cells whose configuration is not changed is reused in a similar manner.

1.4 Detailed Pipelines

Figure 9:
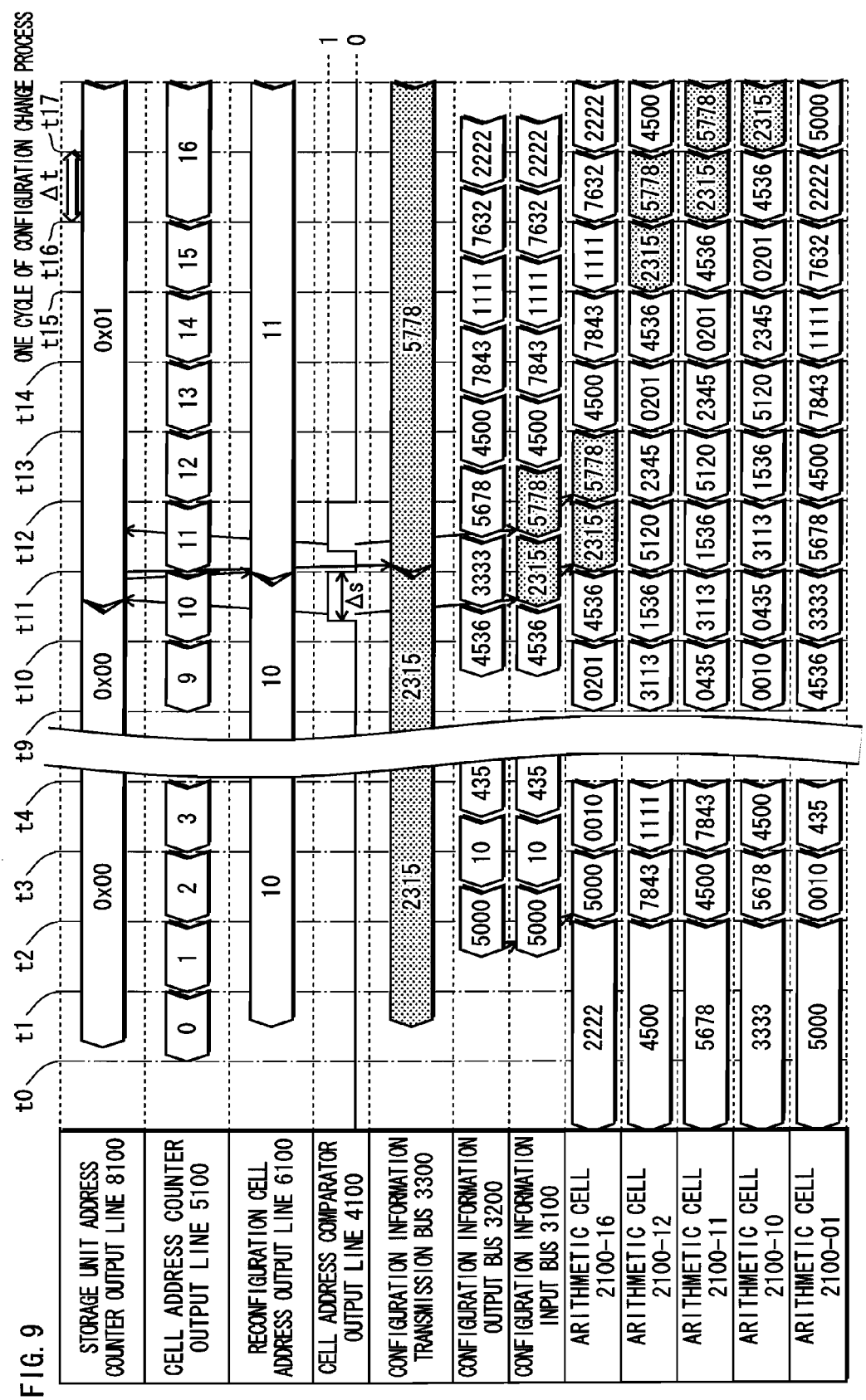
FIG. 9 shows relationship among individual configuration elements on a cycle basis for the time when the configuration is changed from Configuration A to Configuration B, according to Embodiment 1 of the present invention.

Pipelines of configuration elements for the change from Configurations A to B are shown in FIG. 9. The detailed data transition during the configuration change is described below with the aid of FIG. 9.

At the time t0, the storage unit address counter 8000 initializes the counter value of the cell address counter 5000 to 0. Along with this, the output value of the cell address counter output line 5100 becomes 0. After the initialization, the cell address counter 5000 counts up the counter value by one every period of Δt (times t1, t2, t3, . . . ).

In addition, the storage unit address counter 8000 starts outputting the initial address "0×00" to the storage unit address counter output line 8100.

When receiving the output of "0×00", the reconfiguration cell address output line 6100 starts outputting the cell address "10", and the configuration information transmission bus 3300 starts outputting the configuration information "2315".

At the time t0, the configuration of the dynamic reconfiguration arithmetic block 2010 is Configuration A, and therefore the configuration information of the arithmetic cells 2100-16, 2100-12, 2100-11, 2100-10 and 2100-01 is "2222", "4500", "5678", "3333" and "5000", respectively (see Configuration A of FIG. 5).

At the time t1, the cell address counter 5000 counts up the counter value to "1". The cell address counter 5000 outputs the pulse signal to the shift register 2300.

When the pulse signal is received, the storage unit 2301 (corresponding to the arithmetic cell 2100-01), which is a constituent of the shift register 2300, outputs the configuration information "5000" stored therein to the configuration information output bus 3200, and the remaining storage units 2302-2316 shift the configuration information they hold to the neighboring storage units. Each of the arithmetic cells 2100 lodes the configuration information written to the corresponding one of the storage units 2301-2315.

Since the output value "1" of the cell address counter output line 5100 and the output value "10" of the reconfiguration cell address output line 6100 do not match each other, the cell address comparator 4000 outputs 0 to the cell address comparator output line 4100.

Since the configuration information selector 3400 after receiving the signal 0 connects the configuration information output bus 3200 to the configuration information input bus 3100, the configuration information "5000" is input to the shift register 2300 and then stored in the storage unit 2316. The configuration information "5000" stored in the storage unit 2316 is loaded to the arithmetic cell 2100-16.

Accordingly, at this point, the configuration information of the arithmetic cells 2100-16, 2100-12, 2100-11, 2100-10 and 2100-01 is "5000", "7843", "4500", "5678" and "0010", respectively.

At the time t2, the cell address counter 5000 counts up the counter value to "2", and the output value of the cell address counter output line 5100 becomes "2". Here, again, since the output values of the cell address counter output line 5100 and the reconfiguration cell address output line 6100 do not match each other, the configuration information stored in the storage unit 2301 constituting the shift register 2300 is shifted to the storage unit 2316, and the configuration information stored in the storage units 2302-2316 is shifted to the neighboring storage units as in the same case with the time t1. Each arithmetic cell 2100 loads configuration information stored in its corresponding storage unit.

Similar processing is repeated until the time t9.

At the time t10, the cell address counter 5000 counts up the counter value to "10" and outputs the pulse signal to the shift register 2300.

The shift register 2300 outputs the configuration information stored in the storage unit 2301 (corresponding to the arithmetic cell 2100-01), and internally shifts configuration information among the storage units.

At this point, since the output values of the cell address counter output line 5100 and the reconfiguration cell address output line 6100 are both "10", the cell address comparator 4000 outputs 1 to the cell address comparator output line 4100 during the time period Δs.

The configuration information selector 3400 after receiving the signal 1 connects the configuration information transmission bus 3300 to the configuration information input bus 3100. Accordingly, the configuration information "2315" output from the configuration information storage unit 3000 is input to the shift register 2300, and then written to the storage unit 2316. The arithmetic cell 2100-16 loads the configuration information "2315" written to the storage unit 2316.

In addition, the storage unit address counter 8000 after receiving 1 from the cell address comparator output line 4100 increases the output value by one and starts outputting "0×01".

The reconfiguration cell address storage unit 6000 after receiving "0×01" via the storage unit address counter output line 8100 outputs the cell address "11" stored in the address "0×01" to the reconfiguration cell address output line 6100.

Similarly, the configuration information storage unit 3000 after receiving "0×01" starts outputting the configuration information "5778" stored in the address "0×01".

At the time t11, the output value of the cell address counter output line 5100 is "11", which matches the output value of the reconfiguration cell address output line 6100. Accordingly, the cell address comparator 4000 outputs 1 via the cell address comparator output line 4100.

The configuration information selector 3400 after receiving the signal 1 connects the configuration information transmission bus 3300 to the configuration information input bus 3100. Accordingly, the configuration information "5778" is input to the shift register 2300, and then written to the storage unit 2316. The arithmetic cell 2100-16 loads the configuration information "5778" written to the storage unit 2316.

At this point, the storage unit address counter 8000, although receiving 1 via the cell address comparator output line 4100, does not increment the output value since the value currently being output "0×01" and the end address match each other.

Accordingly, since from the time t12 onwards, the output value of the reconfiguration cell address output line 6100 remains as "11", the output values of the cell address counter output line 5100 and the reconfiguration cell address output line 6100 do not match. Accordingly, from the time t12 to the time t16, the cell address counter 5000 continues counting up of the counter value, and the shift register 2300 cyclically shifts the configuration information stored in the storage units 2301-2316 at each time of the counting up.

At the time t17, the counter value of the cell address counter 5000 is already 16, which is the number of the arithmetic cells. Therefore, the cell address counter 5000 stops counting up, and ends the operation of the configuration change.

At this point, although the configuration information of the arithmetic cells 2100 of the cell addresses "10" and "11" has been changed, the configuration information of the rest of the arithmetic cells 2100 is the same as before the start of the configuration change.

1.5 Conclusions

As has been explained, according to the present invention, the dynamic reconfiguration arithmetic block includes the shift register, which is made up of storage units connected in series, and the configuration information of each dynamic reconfiguration arithmetic cell is cyclically shifted by control of the control unit. Here, only configuration information needed to be changed is replaced with new configuration information, and the remaining configuration information is reused.

Accordingly, it is necessary for the configuration information storage unit to store therein only new configuration information of dynamic reconfiguration arithmetic cells requiring configuration change, and thus the memory capacity in the circuit can be reduced.

The above-mentioned Patent Reference 1 discloses a technology for realizing a reduction of configuration information to be stored.

Figure 19:
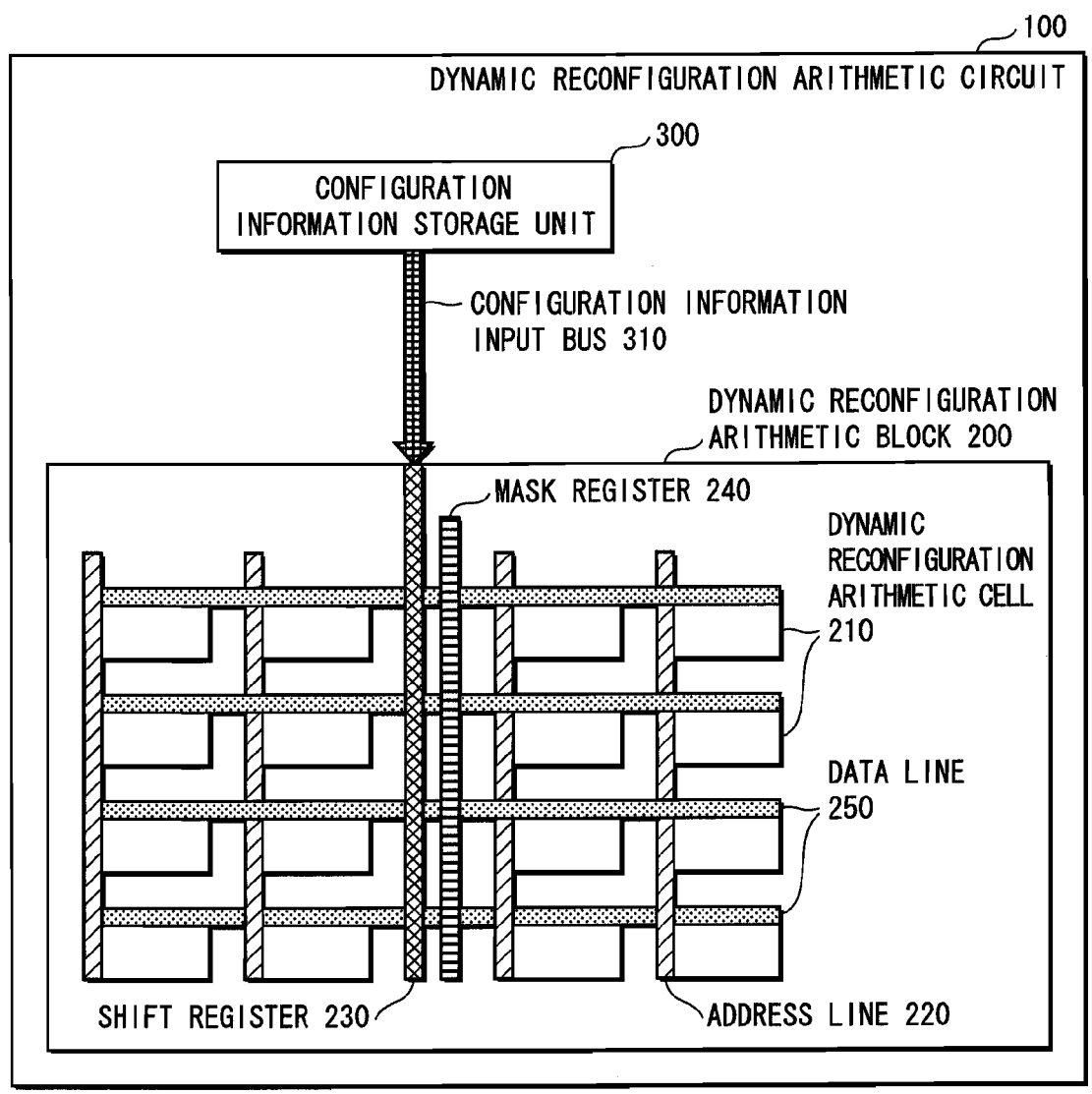
FIG. 19 is a schematic diagram of a dynamic reconfiguration arithmetic circuit apparatus of Patent Reference 1.

FIG. 19 is a schematic diagram of a dynamic reconfigurable arithmetic circuit disclosed by Patent Reference 1. The dynamic reconfigurable arithmetic block 200 can change, in accordance with arithmetic operation to be processed, the operational contents and connection configuration of the arithmetic cells 210. The change of operation contents and connections by the dynamic reconfiguration arithmetic block 200 is realized by that configuration information input from the shift register 230 is transmitted to each of the arithmetic cells 210. The configuration information input from the shift register 230 is distributed by each data line 250. The configuration of the arithmetic cells 210 in the region specified by the address line 220 and not masked by the mask register 240 is changed by the distributed configuration information.

Thus, by specifying the region to be changed, the configuration information of the arithmetic cells 210 whose configuration is not to be changed can be used again.

As a result, it is necessary to prepare only the configuration information for a part that requires a change, whereby being able to reduce the data size of the configuration information and therefore to decrease the capacity required for the configuration information storage unit 300.

However, with the structure of Patent Reference 1, the hardware resources for changing the configuration increase according to the number of the arithmetic cells 210. As a result, when the reconfigurable logic circuit is of large scale, the area occupied by the hardware resources becomes large. Specifically speaking, assume that the total number of the arithmetic cells 210 is N pieces, the area occupied by one arithmetic cell 210 of the data line 250 is a, the number of arithmetic cells disposed in the vertical direction is β, the area occupied by one arithmetic cell 210 of the mask register 240 is b, and the area occupied by one arithmetic cell 210 of the address line 220 is c. In this case, the area of (a+c)×N+b×β is occupied by the hardware resources required for changing the configuration. Thus, a large-scale reconfiguration logic circuit having a large number of arithmetic cells 210 has a problem regarding the area for the configuration change.

Compared to this technology, according to the present invention, even when the number of dynamic reconfiguration arithmetic cells in the dynamic reconfiguration arithmetic block increases, the circuit of the control unit does not substantially change in size. Further, in the dynamic reconfiguration arithmetic block, the shift register is the only hardware resource for configuration change, and therefore even if the number of the dynamic reconfiguration arithmetic cells increases, an increase in the overall area of the dynamic reconfiguration arithmetic block can be reduced as compared to the technology of Patent Reference 1. Accordingly, the present invention can inhibit an increase in the area required for configuration change of the dynamic reconfiguration arithmetic block.

1.6 Additional Remarks

Embodiment 1 has been explained above, however, it is merely an example, and the following cases are also within the scope of the present invention.

(1) The storage unit address counter 8000 has been described as it prestores therein pairs of initial and end addresses of an area, within the reconfiguration cell address storage unit 6000 and the configuration information storage unit 3000, which stores therein data necessary for configuration change. Instead of this case, the initial and end addresses may be indicated by a control mechanism of the apparatus having thereon the dynamic reconfiguration arithmetic circuit 110 at each time of the configuration change.

(2) In addition, the storage unit address counter 8000 has been described as it initializes the cell address counter 5000. Instead, the control mechanism of the apparatus having the dynamic reconfiguration arithmetic circuit 110 may perform the initialization.

(3) In Embodiment 1 above, every time when configuration information stored in each storage unit is changed, a corresponding arithmetic cell is rewritten according to new configuration information. That is, regarding the configuration change of the dynamic reconfiguration arithmetic block including sixteen arithmetic cells, the arithmetic cells are reconfigured every time when configuration information is shifted in the shift register, and thus reconfiguration is performed sixteen times in total. However, the present invention is not limited to this case.

For example, after configuration information is appropriately written to all the storage units—i.e. when the counter value of the cell address counter 5000 reaches 16, reconfiguration of sixteen arithmetic cells all together may be performed.

2. Embodiment 2

The following describes Embodiment 2 of the present invention with the aid of drawings.

2.2 Structure and Operation

Figure 10:
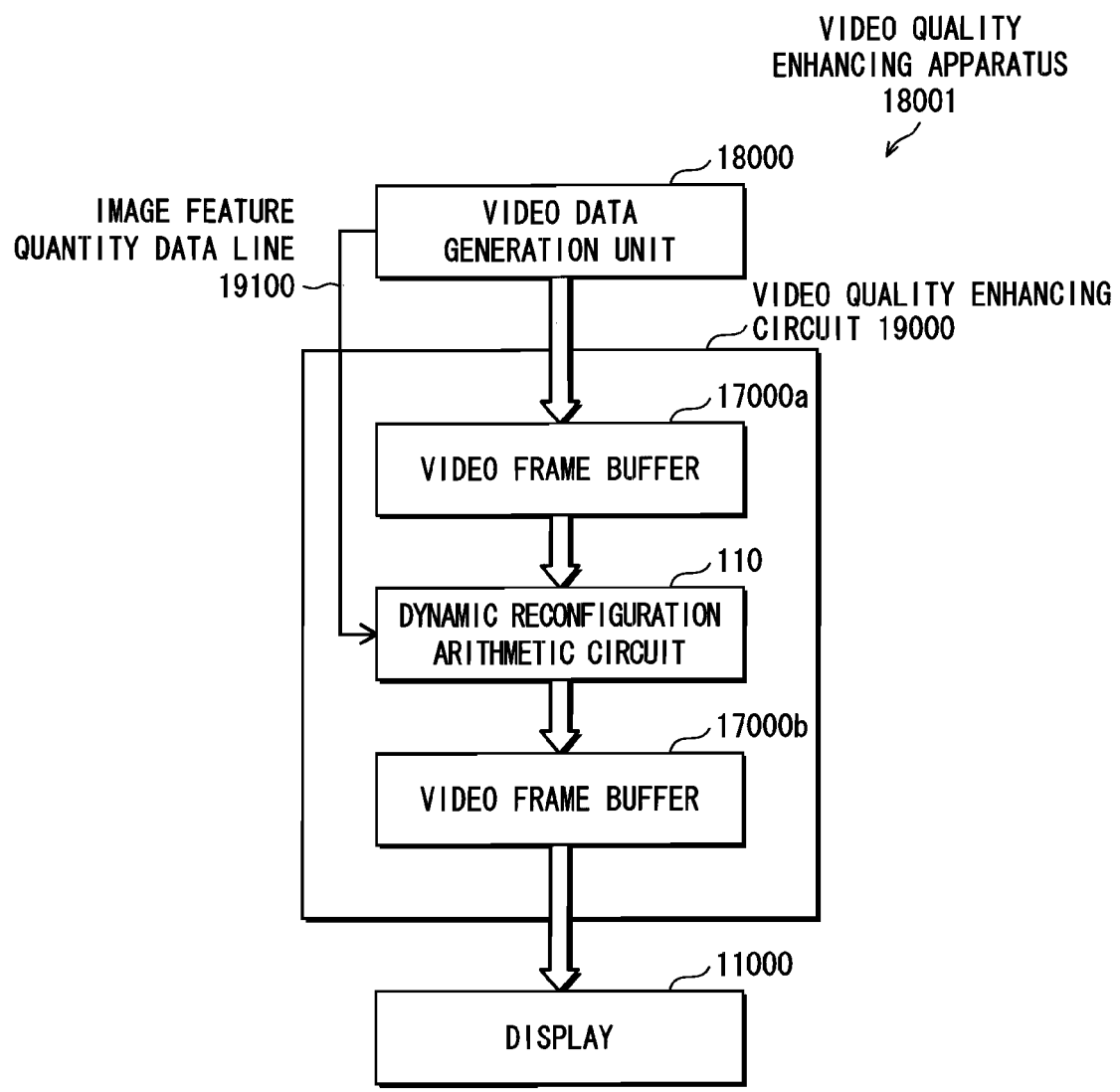
FIG. 10 is a block diagram showing a quality enhancing apparatus 18001 using a dynamic reconfiguration arithmetic circuit 110 of Embodiment 2 of the present invention.

FIG. 10 shows a video quality enhancing apparatus 18001 of Embodiment 2.

The video quality enhancing apparatus 18001 includes a video data generation unit 18000, a video quality enhancing circuit 19000, an image feature quantity data line 19100 and a display 11000.

The video quality enhancing apparatus 18001 has functions of inputting video data generated by the video data generation unit 18000 to the video quality enhancing circuit 19000 and displaying the video data with enhanced quality on the display 11000.

The video quality enhancing circuit 19000 includes video frame buffers 17000*a* and 17000*b* and a dynamic reconfiguration arithmetic circuit 110.

The structure of the dynamic reconfiguration arithmetic circuit 110 is the same as in the case of Embodiment 1 and is shown in FIG. 1. The components identical to those in Embodiment 1 are given the same reference numerals, and the explanation for these components is omitted.

The video data input from the video data generation unit 18000 is stored in the video frame buffer 17000*a*, then becomes subject to video quality enhancing processing performed by the dynamic reconfiguration arithmetic circuit 110, and is subsequently stored in the video frame buffer 17000*b*. Then, the video data is transmitted to the display 11000 by the video frame buffer 17000*b*.

FIGS. 11 and 12 show examples of calculation formulae of a filtering process performed by the dynamic reconfiguration arithmetic circuit 110 for enhancing video quality.

Figure 13:
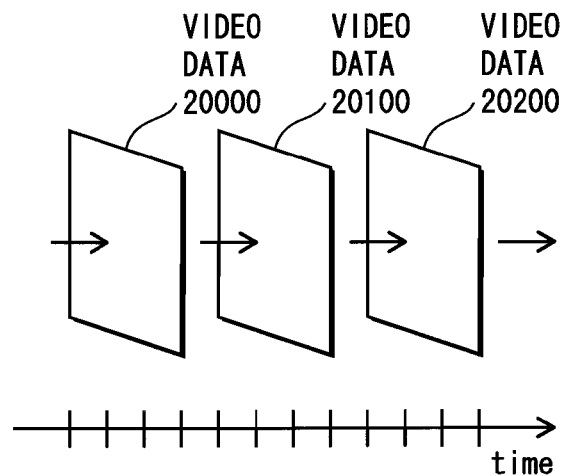
FIG. 13 shows the processing order of video images according to Embodiment 2 of the present invention.

In addition, the order of video images processed by the dynamic reconfiguration arithmetic circuit is shown in FIG. 13. As shown in FIG. 13, the video quality enhancing processing is performed in the order of image data 20000, 20100 and 20200.

The video quality enhancing apparatus 18001 performs, on video data, a filtering process based on the calculation shown in FIG. 11 or FIG. 12 in accordance with the feature of the video data.

Specifically speaking, when video data has the amount of noise less than a predetermined threshold, the filtering process is performed using the calculation formula of FIG. 11:

$$X2'=(1*X1+1*X3)/2,$$

X1: data of a pixel to the immediate left of X2,
X2: data of a pixel for correction,
X3: data of a pixel to the immediate right of X2, and
X2': data of a pixel after corrected.
When video data has the amount of noise exceeding the predetermined threshold, the filtering process is performed using the calculation formula of FIG. 12:

$$X2'=(1*X1+2*X2+1*X3)/4,$$

X1: data of a pixel to the immediate left of X2,
X2: data of a pixel for correction,
X3: data of a pixel to the immediate right of X2, and
X2': data of a pixel after corrected.

The video data generation unit 18000 has a function of detecting the amount of noise of each piece of video data. For example, assume that there are pieces of video data 20000, 20100 and 20200. Of them, if the video data generation unit 18000 detects the noise of video data 20100 exceeding the predetermined threshold, then the video data generation unit 18000 transmits information indicating that the video data 20100 has a high noise level to the dynamic reconfiguration arithmetic circuit 110 via the image feature quantity data line 19100.

When receiving the information, the dynamic reconfiguration arithmetic circuit 110 performs, on the video data 20000 and 20200, the filtering process using the calculation shown in FIG. 11 and performs, on the video data 20100, the filtering process using the calculation shown in FIG. 12.

In order to realize this, the dynamic reconfiguration arithmetic circuit 110 performs the configuration change between the process of the video data 20000 and the process of the video data 20100 and between the process of the video data 20100 and the process of the video data 20200.

Regarding the configuration change, the configuration information for only dynamic reconfiguration arithmetic cells requiring configuration change is changed, and the configuration information before the configuration change is used for the remaining dynamic reconfiguration arithmetic cells, as described in Embodiment 1.

Figure 14:
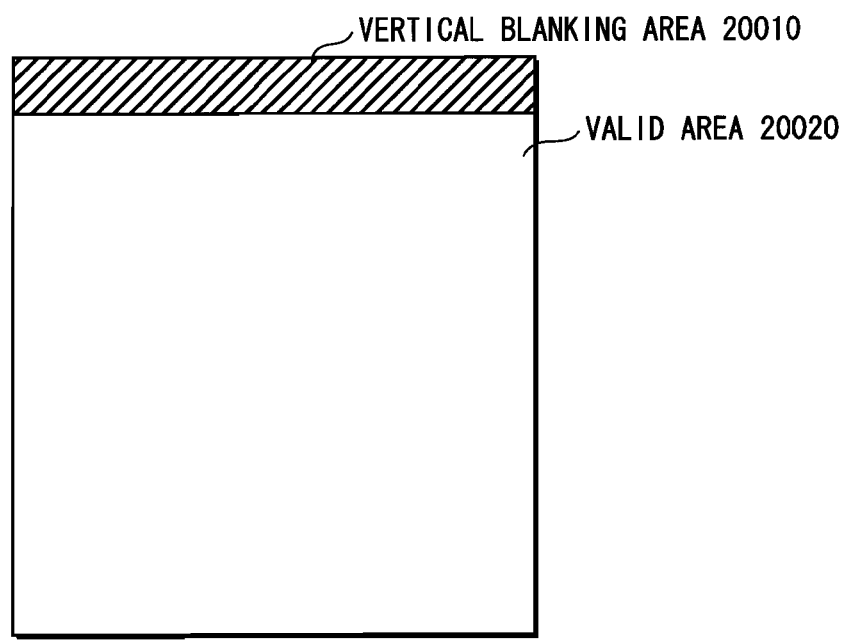
FIG. 14 shows relationship between a vertical blanking area and a valid area for video image transmission according to Embodiment 2 of the present invention.

The respective pieces of video data are input to the dynamic reconfiguration arithmetic circuit 110 in order starting from the top horizontal line data. In each piece of video data, there is a time period—called a vertical blanking area 20010—during which invalid data is transmitted, as shown in FIG. 14.

The dynamic reconfiguration arithmetic circuit 110 detects the blanking area and starts the configuration change. The configuration change is completed within the period of the vertical blanking area 20010.

3. Embodiment 3

Figure 15:
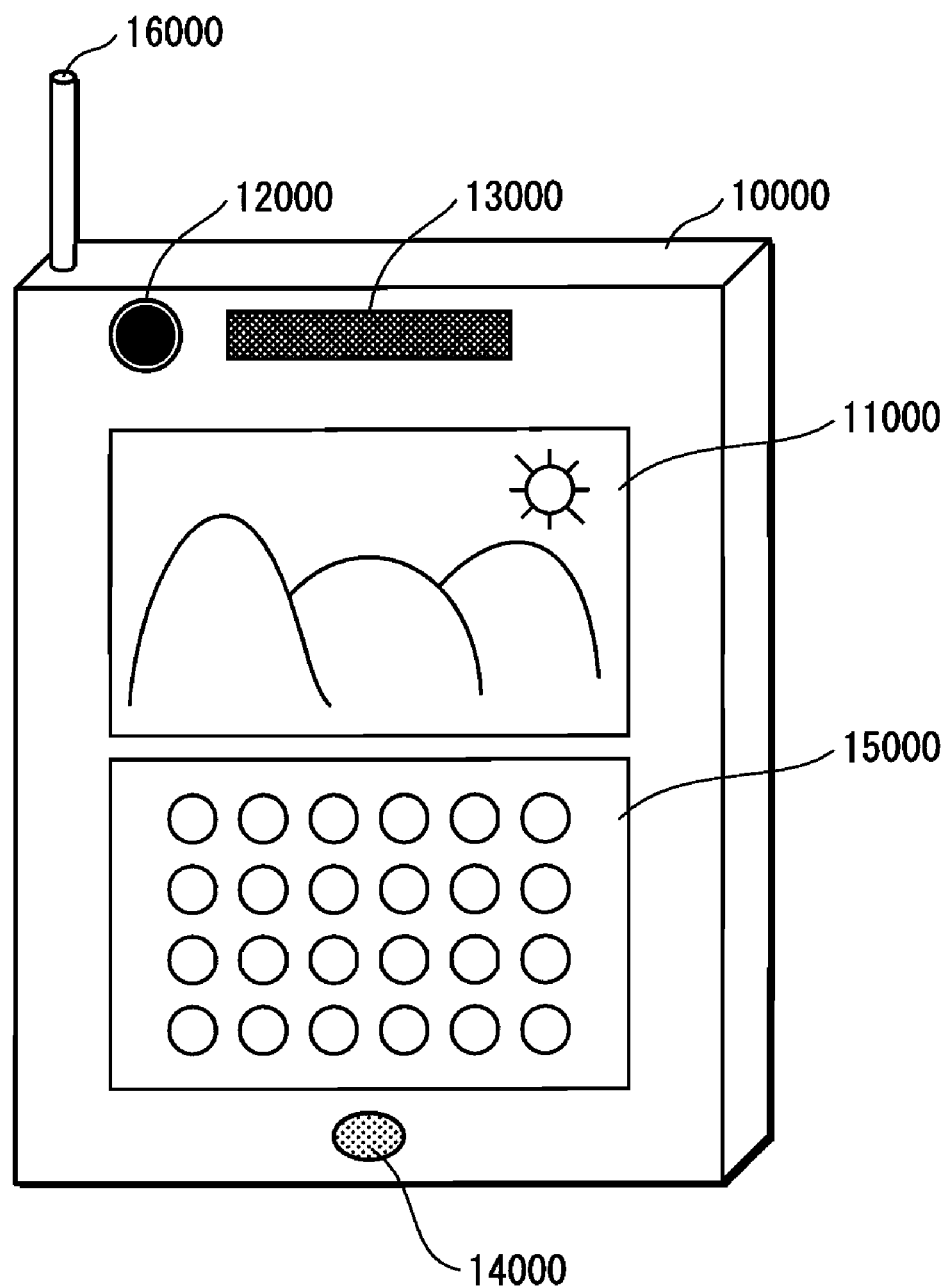
FIG. 15 shows an external appearance of a mobile communication apparatus 10000 using the dynamic reconfiguration arithmetic circuit 110 of Embodiment 3 of the present invention.

FIG. 15 shows an external appearance of a mobile communication apparatus 10000 according to Embodiment 3 of the present invention.

As the mobile communication apparatus 10000, various types of apparatuses can be considered—for example, a mobile telephone, a PDA, a mobile video playback apparatus, a mobile music playback apparatus and a digital camera.

As shown in FIG. 15, the mobile communication apparatus 10000 includes a display 11000, an imaging unit 12000, an audio output unit 13000, an audio input unit 14000, a command input unit 15000, and an antenna 16000. In addition, the mobile communication apparatus 10000 has therein the dynamic reconfiguration arithmetic circuit 110 described in Embodiment 1.

The structure of the dynamic reconfiguration arithmetic circuit 110 is the same as in the case of Embodiment 1 and is shown in FIG. 1. The components identical to those in Embodiment 1 are given the same reference numerals, and the explanation for these components is omitted.

3.1 Functions of Mobile Communication Apparatus 10000

The following provides specific examples regarding functions of the mobile communication apparatus 10000.

Note that the following functions are merely examples, and the mobile communication apparatus 10000 may also have other functions.

(1) Image Playback Function

The dynamic reconfiguration arithmetic circuit 110 is connected to the display 11000 via a video frame buffer. The dynamic reconfiguration arithmetic circuit 110 performs a decoding process of still images such as JPEG, a decoding process of video such as MPEG, a three-dimensional graphics process for games and the like, and a text drawing process. The dynamic reconfiguration arithmetic circuit 110 also performs a process of superimposing respective images. Subsequently, the dynamic reconfiguration arithmetic circuit 110 writes processed image data to the frame buffer.

The display 11000 obtains the processed image data from the frame buffer and displays video based on the obtained image data.

(2) Imaging Function

The dynamic reconfiguration arithmetic circuit 110 is also connected to the imaging unit 12000 via the video frame buffer.

The imaging unit 12000 writes captured image data to the video frame buffer.

The dynamic reconfiguration arithmetic circuit 110 obtains the image data from the video frame buffer, and performs an encoding process on the obtained image data. Specific examples of the encoding process include an encoding process of still images, such as JPEG, and an encoding process of video, such as MPEG.

(3) Audio Playback Function

Furthermore, the dynamic reconfiguration arithmetic circuit 110 is connected to the audio output unit 13000 via an audio frame buffer. The dynamic reconfiguration arithmetic circuit 110 performs an MPEG and other audio decoding processes, and writes decoded audio data to the audio frame buffer. The audio output unit 13000 reads audio data from the audio frame buffer, generates audio based on the read audio data, and outputs the audio.

(4) Recording Function

The dynamic reconfiguration arithmetic circuit 110 is also connected to the audio input unit 14000 via the audio frame buffer.

The audio input unit 14000 including a microphone or the like picks up audio and generates audio data, and writes the generated audio data to the audio frame buffer.

The dynamic reconfiguration arithmetic circuit 110 reads the audio data from the audio frame buffer, and performs an MPEG audio encoding process, for example, on the read audio data.

In the above (1)-(4), the dynamic reconfiguration arithmetic circuit 110 performs decoding and encoding processes in conformity with JPEG, MPEG or the like. However, there are various types of video and audio processing standards, and contents of processes are respectively different. By causing the dynamic reconfiguration arithmetic block 2010 to process parts which have the different process contents and would impose a heavy load on the processor, it is possible to flexibly conform to processes of various standards.

(5) Communication Function

The dynamic reconfiguration arithmetic circuit 110 is connected to the antenna 16000 and a radio frequency circuit block (not shown). These three form a radio network when the dynamic reconfiguration arithmetic circuit 110 performs a communication process. The dynamic reconfiguration arithmetic circuit 110 also performs encrypting and decrypting processes of transmitting and receiving data.

There are various types of communication and encryption standards, and contents of processes are respectively different. By causing the dynamic reconfiguration arithmetic block 2010 to process parts which have the different process contents and would impose a heavy load on the processor, it is possible to flexibly respond to processes of various standards.

(6) Reception of User Operation

The command input unit 15000 includes a number of buttons as shown in FIG. 15. For example, a playback button, a stop button, direction keys and an enter button are provided. The command input unit 15000 receives a button operation made by the user, and outputs an instruction to each function part, including the dynamic reconfiguration arithmetic circuit 110, in accordance with the received operation to thereby realize the individual functions described in the above sections (1)-(5).

3.2 Conclusions

Many communication systems, image processing systems and security process systems are designed to conform to multiple standards. Therefore, as the mobile communication apparatus 10000 of the present invention, by providing the dynamic reconfiguration arithmetic circuit 110 thereon and causing the configuration of the circuit to change according to need, it is possible to perform processes in conformity with each standard without requiring to equip a number of hardware circuits.

Further, the dynamic reconfiguration arithmetic circuit 110 can be applied not only to the mobile communication apparatus described in the present embodiment but also to image display apparatuses (e.g. TVs, DVD players and car navigation systems), image recording apparatuses (e.g. DVD recorders, video cameras, DSCs, and security cameras), audio players, and communication systems and security processing systems in communication apparatuses.

4. Other Modifications

The embodiments of the dynamic reconfiguration arithmetic circuit 110 of the present invention have been explained, however, the present invention is not limited to the above embodiments. The dynamic reconfiguration arithmetic circuit 110 shown in the respective embodiments may be partially modified in the following manners.

(1) Although, in Embodiment 1, the arithmetic cells of the dynamic reconfiguration arithmetic block 2010 are arranged in a 4-by-4 matrix, it may be a 10-by-4 rectangular matrix. Alternatively, the arithmetic cells may be arranged in a line, and thus the present invention is not subject to the arrangements of the arithmetic cells.

Functions performed by the dynamic reconfiguration arithmetic cells 2100 conceivably include multiplication, shifting, addition, logic operation, division, subtraction and rotation. The kinds of functions that can be performed by the arithmetic cells 2100 making up the dynamic reconfiguration arithmetic block 2010 are not particularly limited, and each arithmetic cell 2100 may perform various kinds of functions, or may perform only limited kinds of functions. Further, the arithmetic cells 2100 making up the dynamic reconfiguration arithmetic block 2010 may all have the same structure. Or alternatively, arithmetic cells each having a different function may be included—e.g. only particular arithmetic cells can perform a division calculation.

In the above embodiments, all the dynamic reconfiguration arithmetic cells 2100 are reconfigurable; however, nonreconfigurable arithmetic cells 2100 may be included.

The dynamic reconfiguration arithmetic cells 2100 may be, for example, single-input and single-output cells, or three-input and two-output cells. Thus, the number of inputs and outputs may be varied. Such variation can be adjusted by increasing the number of inputs and outputs of the arithmetic cells 2100.

Note that the dynamic reconfiguration arithmetic cells 2100 may operate on the same clock. Instead, multiple clock lines may be provided and each arithmetic cell may operate on a different arithmetic operation clock.

(2) In Embodiment 1, all arithmetic cells 2100 are connected to one shift register 2300; however, there may be multiple shift registers 2300. In the case, the number of arithmetic cells connected to each shift register can be and the bit count of the configuration information may be different. Additionally, multiple shift registers may be connected to a single configuration information selector 3400, or may be connected to different configuration information selector 3400 and configuration information storage unit 3000.

(3) Reuse of the configuration information is realized in Embodiment 1. As has mentioned above, configuration information includes the type of arithmetic operation performed by a corresponding arithmetic cell, an arithmetic parameter and wiring information. Accordingly, not the entire configuration information but only the arithmetic parameter may be reused. In the case, each configuration element uses the arithmetic parameter instead of the configuration information. Note that a different means may be used for changing the type of arithmetic operation and wiring information, or another set of hardware resources for changing the type of arithmetic operation and wiring information may be provided where the change is performed as in the same manner as in Embodiment 1.

Further, in the case of changing the arithmetic parameter, configuration information stored by the individual storage units making up the shift register 2300 may be cyclically shifted as in the case of Embodiment 1. In this case, the configuration information storage unit 3000 stores a new arithmetic parameter for each dynamic reconfiguration arithmetic cell whose parameter needs to be changed. The control unit 2000 cyclically shifts configuration information held by the individual storage units making up the shift register 2300 in the same procedure as in Embodiment 1.

When configuration information corresponding to a dynamic reconfiguration arithmetic cell whose parameter needs to be changed is output (specifically speaking, when the cell address comparator 4000 outputs 1), the configuration information selector 3400 rewrites the arithmetic parameter included in the configuration information output from the shift register 2300 with configuration information stored in the configuration information storage unit 3000, and inputs the result to the shift register 2300.

(4) In Embodiment 1, the dynamic reconfiguration arithmetic circuit 110 includes the configuration information storage unit 3000 and the reconfiguration cell address storage unit 6000 separately; however, they may be integrated into one storage unit. In the case, within the storage unit, configuration information and its corresponding cell address are stored in the same address, and among output data, a cell address is input to the cell address comparator 4000 while configuration information is input to the configuration information selector 3400.

(5) In Embodiment 2, the configuration is changed in the vertical blanking area; however, the configuration may be changed in a horizontal blanking area instead.

The video quality enhancing circuit 19000 includes two video frame buffers; however, it may not include them therein.

The video data generation unit 18000 detects a feature of video; however, this may be done by the dynamic reconfiguration arithmetic circuit 110 instead.

(6) The dynamic reconfiguration arithmetic circuit 110 described in Embodiment 1 above includes one dynamic reconfiguration arithmetic block 2010; however, it may include two or more dynamic reconfiguration arithmetic blocks.

In this case, the control unit and the configuration information storage unit (hereinafter, these are collectively referred to as the "reconfiguration mechanism") may be provided for each dynamic reconfiguration arithmetic block. Alternatively, the configuration change of the multiple dynamic reconfiguration arithmetic blocks may be performed by a single reconfiguration mechanism.

The following explains an example in which one reconfiguration mechanism performs configuration change of two dynamic reconfiguration arithmetic blocks.

Figure 16:
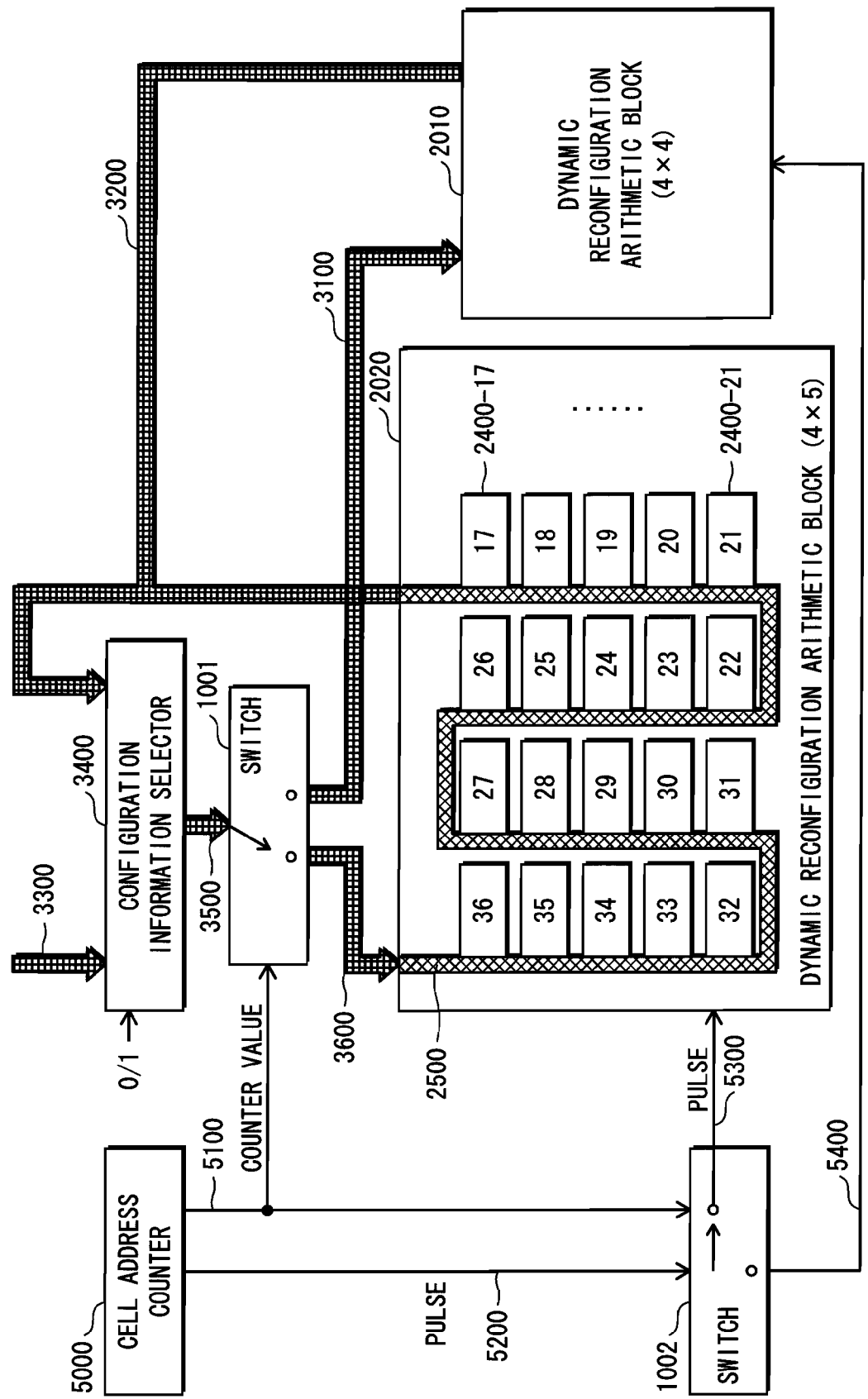
FIG. 16 shows a modification of the dynamic reconfiguration arithmetic circuit of the present invention.

FIG. 16 is a block diagram showing a part of the dynamic reconfiguration arithmetic circuit of the present modification.

The components identical to those in Embodiment 1 are given the same reference numerals.

The dynamic reconfiguration arithmetic circuit includes new dynamic reconfiguration arithmetic block 2020 and switches 1001 and 1002.

The dynamic reconfiguration arithmetic block 2020 includes twenty dynamic reconfiguration arithmetic cells 2400-17 to 2400-36 arranged in a 4 by 5 matrix. The dynamic reconfiguration arithmetic cells are individually connected to the shift register 2500, and the cell addresses "17", "18", "19", . . . , and "36" are assigned to them in order of the closest to the output terminal of the shift register to the furthest.

Similar to the shift register 2300, the shift register 2500 is structured by connecting in series twenty storage units corresponding to the individual arithmetic cells. Each storage unit stores configuration information of a corresponding arithmetic cell.

The cell address counter 5000 counts up the counter value at regular intervals (Δt), as in Embodiment 1. Here, the cell address counter 5000 outputs the counter value and pulse signal to the switch 1002.

The switch 1002 receives the pulse signal and counter value from the cell address counter 5000. When the received counter value indicates "16"—which is the total number of the arithmetic cells 2100 making up the dynamic reconfiguration arithmetic block 2010—or less, the switch 1002 connects a signal line 5200 to a signal line 5400 to allow the pulse signal to be input to the dynamic reconfiguration arithmetic block 2010.

When the received counter value indicates "17" or more, the switch 1002 connects the signal line 5200 and a signal line 5300 to allow the pulse signal to be input to the dynamic reconfiguration arithmetic block 2020.

According to this structure, the pulse signal is input to only one of the two dynamic reconfiguration arithmetic blocks. The shift register in one of the dynamic reconfiguration arithmetic blocks, to which the pulse signal has been input, outputs configuration information stored by the storage unit closest to the output terminal to the configuration information output bus 3200, and the remaining storage units shift the configuration information to the neighboring storage units.

The cell address counter 5000 also outputs the counter value to the switch 1001 via the cell address counter output line 5100.

The switch 1001 receives the configuration information from the configuration information selector 3400 via a configuration information interchange bus 3500. Here, if the counter value received from the cell address counter 5000 indicates "16" or less, the switch 1001 connects the configuration information interchange bus 3500 and the configuration information input bus 3100.

When the received counter value indicates "17" or more, the switch 1001 connects the configuration information interchange bus 3500 to the configuration information input bus 3600.

Although not being shown, the storage unit address counter initializes the cell address counter 5000 to 0 at the start of the configuration change, and stops the cell address counter 5000 when the counter value thereof reaches 36.

According to the above structure, it is possible to build, in two dynamic reconfiguration arithmetic blocks, circuits having different functions.

In addition, the storage unit address counter 8000 has a control to set the initial value of the cell address counter 5000 to "0" and the end value to "16", and herewith it is possible to change the configuration of only the dynamic reconfiguration arithmetic block 2010 without giving no influence to the dynamic reconfiguration arithmetic block 2020.

Further, by setting the initial value of the cell address counter 5000 to "17" and the end value to "36", it is possible to change the configuration of only the dynamic reconfiguration arithmetic block 2020 without giving no influence to the dynamic reconfiguration arithmetic block 2010.

(7) Assume an example of, in the above modification, mounting multiple dynamic reconfiguration arithmetic blocks made up of dynamic reconfiguration arithmetic cells.

Here, the storage unit address counter has a control so that the switch 1001 connects the configuration information interchange bus 3500 to all the configuration information input buses regardless of the counter value of the cell address counter, and that the cell address comparator 4000 always outputs 0.

Further, by setting the initial value of the cell address counter to "0" and the end value to "16", it is possible to allow all the dynamic reconfiguration arithmetic blocks to have the same structure.

(8) In the above embodiments, each dynamic reconfiguration arithmetic block consists of sixteen dynamic reconfiguration arithmetic cells and a shift register, and the configuration information of each arithmetic block includes a type of arithmetic operation performed by the arithmetic block, an arithmetic parameter, and an arithmetic block from which data subject to the arithmetic operation is obtained.

However, the structure of the dynamic reconfiguration arithmetic block is not limited to this case. For example, it may consist of wiring resources that connect and disconnect wiring between arithmetic cells performing arithmetic operation.

In this case also, similar to Embodiment 1, the shift register structured by connecting in series storage units corresponding to arithmetic cells and wiring resources may shift configuration information and change only configuration information of arithmetic cells and wiring resources requiring change.

(9) The dynamic reconfiguration arithmetic circuit 110 of the present invention only needs to have configuration information of dynamic reconfiguration arithmetic cells 2100 requiring change. As a result, the capacity required for the configuration information storage unit 3000 can be reduced.

Further, regarding the hardware resources for the configuration change, address lines and a mask register whose areas increase depending on the number of the arithmetic cells 2100 are not required.

According to the structure, the number of arithmetic cells 2100 to be updated is small, and thus the dynamic reconfiguration arithmetic circuit 110 is useful in media processing apparatuses using a large-scale reconfiguration arithmetic circuit having a large number of arithmetic cells 2100. In addition, the dynamic reconfiguration arithmetic circuit 110 is applicable to communication and security usage. (10) Further, the present invention is a dynamic reconfiguration arithmetic circuit apparatus comprising: a dynamic reconfiguration arithmetic block changeable to at least two different configurations; a $1^{st}$ wiring connected to an output terminal of the dynamic reconfiguration arithmetic block; a $2^{nd}$ wiring connected to an input terminal of the dynamic reconfiguration arithmetic block; a $1^{st}$ storage unit; a $3^{rd}$ wiring connected to an output terminal of the $1^{st}$ storage unit; and a selector operable to select either data on the $1^{st}$ wiring or data on the $3^{rd}$ wiring and transmit the selected data to the $2^{nd}$ wiring.

(11) In the dynamic reconfiguration arithmetic circuit apparatus according to the modification (10), the dynamic reconfiguration arithmetic block may include: a plurality of dynamic reconfiguration arithmetic cells changeable to at least two different configurations; and a plurality of $2^{nd}$ storage units connected to the dynamic reconfiguration arithmetic cells. Here, the plurality of $2^{nd}$ storage units are linked together in a chain, an output terminal of the chain is connected to the $1^{st}$ wiring, and an input terminal of the chain is connected to the $2^{nd}$ wiring.

(12) Further, in the dynamic reconfiguration arithmetic circuit apparatus according to the modification (11), addresses may be uniquely assigned to the plurality of $2^{nd}$ storage units. Here, the dynamic reconfiguration arithmetic circuit apparatus further comprises: a cell address counter operable to change the addresses in order; a $3^{rd}$ storage unit storing, among the addresses assigned to the $2^{nd}$ storage units, addresses of $2^{nd}$ storage units whose data held therein is to be changed; a cell address comparator operable to compare an output of the cell address counter and an output of the $3^{rd}$ storage unit. The selector determines, based on an output of the cell address comparator, to select either the data on the $1^{st}$ wiring or the data on the $3^{rd}$ wiring.

(13) The dynamic reconfiguration arithmetic circuit apparatus according to the modification (12) may further comprise: a storage unit address counter operable to calculate read addresses of the $1^{st}$ and $3^{rd}$ storage units; a $3^{rd}$ wiring connected to an output terminal of the storage unit address counter; and a $4^{th}$ wiring connected to an output terminal of the storage unit address counter. Here, the $3^{rd}$ wiring is connected to an input terminal of a read address input of the $1^{st}$ storage unit and the $4^{th}$ wiring is connected to an input terminal of a read address input of the $3^{rd}$ storage unit.

(14) In the dynamic reconfiguration arithmetic circuit apparatus according to the above modifications (10)-(13), the $1^{st}$ storage unit may store therein configuration information of the dynamic reconfiguration arithmetic block. Here, the $1^{st}$ and $2^{nd}$ wirings transmit the configuration information and the selector selects the configuration information.

(15) In the dynamic reconfiguration arithmetic circuit apparatus according to the above modifications (10)-(13), the $1^{st}$ storage unit may store therein arithmetic data of the dynamic reconfiguration arithmetic block. Here, the $1^{st}$ and $2^{nd}$ wirings transmit the arithmetic data and the selector selects the arithmetic data.

(16) The dynamic reconfiguration arithmetic circuit apparatus according to the above modifications (10)-(15) may have thereon a dynamic reconfiguration arithmetic circuit recited in one of Claims 1 to 6. Here, the configuration of the dynamic reconfiguration arithmetic block is changed during the time when arithmetic data requiring no processing is being transmitted.

(17) Further, the present invention is an information processing apparatus having thereon the dynamic reconfiguration arithmetic circuit apparatus recited in one of the above modifications (10)-(15).

(18) Further, the configuration information storage unit 3000 and the reconfiguration cell address storage unit 6000 shown in FIG. 1 do not have to be provided inside the dynamic reconfiguration arithmetic circuit 110. It is only necessary to provide a storage mechanism serving the same function within an apparatus having thereon the dynamic reconfiguration arithmetic circuit 110.

Figure 17:
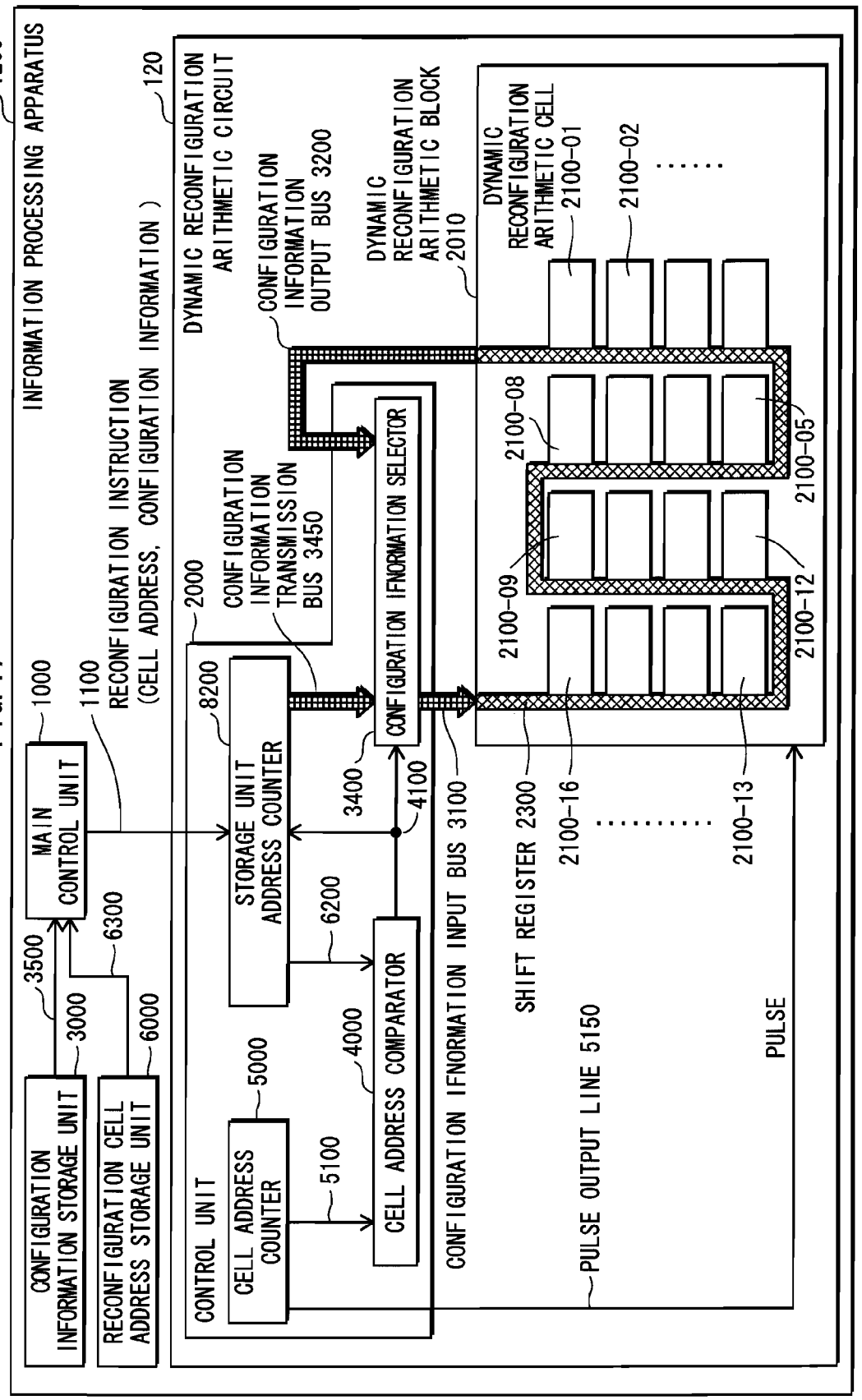
FIG. 17 is a block diagram showing a specific example of Modification (18)

FIG. 17 is a block diagram showing an example of a structure of such an apparatus, an information processing apparatus 1200. Here, there are various apparatuses to be examples of the information processing apparatus 1200, including an image processing apparatus, a mobile telephone, and a game console, and each apparatus conceivably has other function units necessary for itself. For example, in the case of a mobile telephone, it is considered to have a microphone, a speaker, an antenna, and input keys. However, these parts not directly related to the features of the present invention are not shown in the figure.

The information processing apparatus 1200 includes a dynamic reconfiguration arithmetic circuit 120, a main control unit 1000, the configuration information storage unit 3000, and the reconfiguration cell address storage unit 6000. The configuration information storage unit 3000 is connected to the main control unit 1000 via a configuration information storage unit output line 3550, and the reconfiguration cell address storage unit 6000 is connected to the main control unit 1000 via a reconfiguration cell address storage unit output line 6300. The dynamic reconfiguration arithmetic circuit 120 is connected to the main control unit 1000 via a control line 1100.

The configuration information storage unit 3000 and the reconfiguration cell address storage unit 6000 respectively store therein information necessary for changing the configuration of the dynamic reconfiguration arithmetic block 2010, as in Embodiment 1.

When the configuration of the dynamic reconfiguration arithmetic block 2010 needs to be changed, the main control unit 1000 reads corresponding information from the configuration information storage unit 3000 and the reconfiguration cell address storage unit 6000. For example, when the configuration is changed from Configuration A to Configuration B, the main control unit 1000 reads the cell addresses "10" and "11" stored in the area 6001 of the reconfiguration cell address storage unit 6000, and the configuration information "2315" and "5778" stored in the area 3001 of the configuration information storage unit 3000.

Then, the main control unit 1000 outputs reconfiguration information including the read cell addresses and configuration information to the dynamic reconfiguration arithmetic circuit 120.

The structure of the dynamic reconfiguration arithmetic circuit 120 is that of the dynamic reconfiguration arithmetic circuit 110 described in Embodiment 1 without the configuration information storage unit 3000 and reconfiguration cell address storage unit 6000.

Further, a storage unit address counter 8200, different from the storage unit address counter 8000 of Embodiment 1, receives the reconfiguration instruction from the main control unit 1000, temporarily stores the cell addresses and configuration information included in the received reconfiguration instruction, and outputs the cell addresses stored therein to the cell address comparator 4000 via a cell address output line 6200. Similarly, the storage unit address counter 8200 outputs the configuration information stored therein to the configuration information selector 3400 via a configuration information transmission bus 3450. During the period of receiving 0 from the cell address comparator 4000, the storage unit address counter 8200 keeps outputting the same cell address and configuration information; when receiving 1, the storage unit address counter 8200 changes the cell address and configuration information to be output.

The following describes the case in which the dynamic reconfiguration arithmetic block 2010 is changed from Configuration A to Configuration B.

The storage unit address counter 8200 receives, from the main control unit 1000, a reconfiguration instruction including the cell addresses "10" and "11" and configuration information "2315" and "5778". Upon receiving the reconfiguration instruction, the storage unit address counter 8200 initializes the counter value of the cell address counter 5000 to 0. Then, the storage unit address counter 8200 outputs the received cell address "10" to the cell address comparator 4000 via the cell address output line 6200, and outputs the configuration information "2315" to the configuration information selector 3400 via the configuration information transmission bus 3450.

During the period when the output value from the cell address comparator 4000 remains 0, the storage unit address counter 8200 continues the output.

When receiving 1 from the cell address comparator 4000, the storage unit address counter 8200 changes the cell address to be output to the cell address comparator 4000 to "11" and also changed the configuration information to be output to the configuration information selector 3400 to "5778".

The remaining components of the dynamic reconfiguration arithmetic circuit 120 have the same functions as those in Embodiment 1.

(19) Each of the above-mentioned apparatuses and circuits may be, specifically speaking, a computer system composed of a microprocessor, a ROM, a RAM, a hard disk unit, a display unit, a keyboard, a mouse and the like. A computer program is stored in the RAM or the hard disk unit. The microprocessor operates according to the computer program, and thereby the apparatus fulfills its functions. Here, the computer program is structured by combining multiple instruction codes indicating commands to the computer to achieve predetermined functions.

Figure 18:
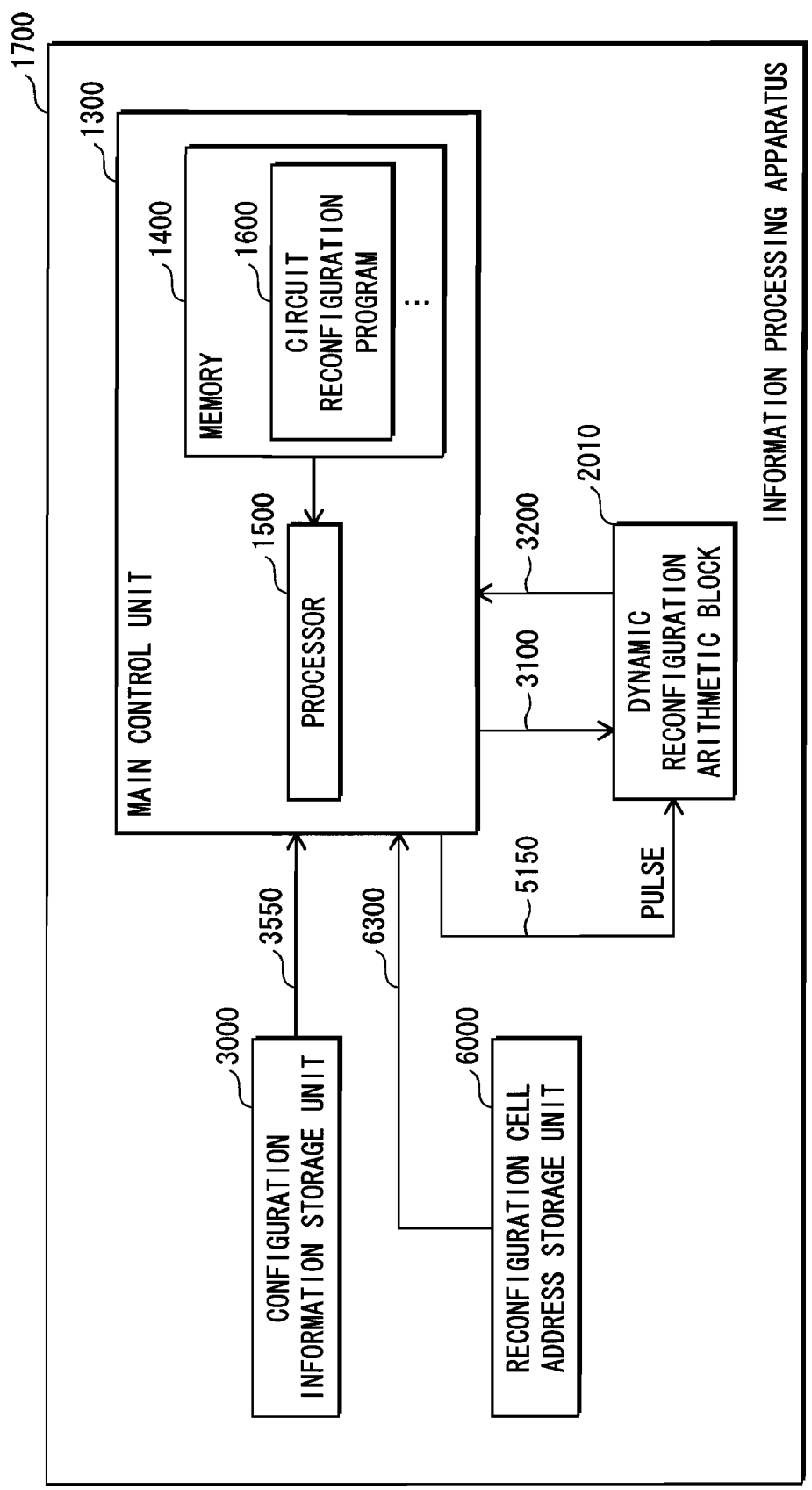
FIG. 18 is a block diagram showing a specific example of Modification (19)

FIG. 18 is a block diagram showing an example of an information processing apparatus 1700 that performs the configuration change of the dynamic reconfiguration arithmetic block 2010 using a program.

Although the information processing apparatus 1700 conceivably has various components besides the ones shown in the figure, the figure shows only components relating to the configuration change of the dynamic reconfiguration arithmetic block 2010.

As shown in FIG. 18, the information processing apparatus 1700 includes the configuration information storage unit 3000, the reconfiguration cell address storage unit 6000, a main control unit 1300, and the dynamic reconfiguration arithmetic block 2010. The configuration information storage unit 3000 is connected to the main control unit 1300 via the configuration information storage unit output line 3550, and the reconfiguration cell address storage unit 6000 is connected to the main control unit 1300 via the reconfiguration cell address storage unit output line 6300. The dynamic reconfiguration arithmetic block 2010 is connected to the main control unit 1300 via the configuration information output bus 3200 and the configuration information input bus 3100. The shift register in the dynamic reconfiguration arithmetic block 2010 receives a pulse signal from the main control unit 1300 via a pulse output line 5150.

The structures of the configuration information storage unit 3000 and the reconfiguration cell address storage unit 6000 are the same as those of the configuration information storage unit 3000 and the reconfiguration cell address storage unit 6000 described in Embodiment 1.

The main control unit 1300 is a computer system including composed of a processor 1500 and a memory 1400. The memory 1400 stores therein various computer programs including a circuit reconfiguration program 1600. The processor 1500 operates according to a computer program stored in the memory 1400, and thereby the information processing apparatus 1700 fulfills part of its functions.

The circuit reconfiguration program 1600 stored in the memory 1400 is, specifically speaking, a procedure of the configuration change of the dynamic reconfiguration arithmetic block 2010, as one shown in FIG. 8, written in machine language readable by the processor 1500.

By the processor 1500 operating according to the circuit reconfiguration program 1600, the main control unit 1300 periodically outputs a pulse signal, reads configuration information stored in each storage unit in the dynamic reconfiguration arithmetic block 2010 via the configuration information output bus 3200, inputs configuration information corresponding to arithmetic cells whose configuration needs not to be changed straight to the dynamic reconfiguration arithmetic block 2010 via the configuration information input bus 3100, and replaces configuration information corresponding to arithmetic cells whose configuration needs to be changed with configuration information stored in the configuration information storage unit 3000 and inputs the replaced configuration information to the dynamic reconfiguration arithmetic block 2010. Herewith, the configuration change of the dynamic reconfiguration arithmetic block 2010 can be realized as in Embodiment 1.

(20) Part or all of the components making up the above individual apparatuses may be assembled as a single system LSI (Large Scale Integration). The system LSI is an ultra-multifunctional LSI produced by integrating multiple components on one chip, and more specifically, is a computer system composed of a microprocessor, ROM, RAM, and the like. A computer program is stored in the RAM. The microprocessor operates according to the computer program, and thereby the system LSI accomplishes its function.

(21) Each element, part or all of the components making up the above individual apparatuses and circuits may be assembled as an IC card detachable from a device, or as a single module. The IC card/module is a computer system composed of a microprocessor, ROM, RAM, and the like. The IC card/module may include therein the above-mentioned ultra-multifunctional LSI. The microprocessor operates according to a computer program, and thereby the IC card/module accomplishes its function. The IC card/module may be tamper resistant.

(22) The present invention may be a method of accomplishing the above-described system. The present invention may be a computer program that achieves the method by a computer, or may be a digital signal representing the computer program.

The present invention may also be achieved by a computer-readable recording medium, such as a flexible disk, a hard disk, a CD-ROM, an MO disk, a DVD, a DVD-ROM, a DVD-RAM, a BD (Blu-ray Disc), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet, or via data broadcasting.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

(23) Assembling only a part, not all, of the functional blocks with an LSI is also within the scope of the present invention. Each of the functional blocks may be assembled on one chip, or part or all of the functional blocks are integrated on one chip. Although referred to here as LSI, it may be also referred to as IC, system LSI, super LSI, and ultra LSI, depending on the degree of integration.

In addition, the method for assembling integrated circuits is not limited to LSI, and a dedicated communication circuit or a general-purpose processor may be used to achieve this.

(24) In the above embodiments and modifications, FPGA and PLD are used as specific examples of the dynamic reconfiguration arithmetic block; however, the present invention is not limited to them. Further, if technology for forming integrated circuits that replaces LSIs is introduced, owing to advance in semiconductor technology or different technology derived therefrom, the integration of functional blocks may naturally be accomplished using such technology. There is also a possibility of application of biotechnology to the integrated circuit technology.

(25) The present invention includes a structure in which two or more of the above embodiments and modifications are combined.

(26) The present invention is applicable operationally and repeatedly in industries that manufacture and sell dynamic reconfiguration arithmetic circuits, industries that manufacture and sell various electrical apparatuses having thereon dynamic reconfiguration arithmetic circuits, and industries that offer services using the electrical apparatuses.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An integrated circuit capable of changing an internal configuration thereof, comprising:
a reconfiguration arithmetic block (i) including a plurality of reconfigurable arithmetic cells and a plurality of cell storage units each of which corresponds to a different one of the arithmetic cells and stores therein a piece of original configuration information indicating all or part of a configuration of the corresponding arithmetic cell, (ii) outputting an output set including therein pieces of original configuration information stored in the cell storage units, (iii) receiving an input set including therein one or some of the pieces of original configuration information included in the output set and one or more pieces of alternative configuration information, each of which is to replace a corresponding one of remaining pieces of original configuration information included in the output set and indicates all or part of a new configuration of a corresponding arithmetic cell whose configuration needs to be changed, and (iv) reconfiguring the arithmetic cells according to the one or some of the pieces of original configuration information and the one or more pieces of alternative configuration information included in the received input set;
a storage unit storing therein the one or more pieces of alternative configuration information; and
a control unit operable to (i) control the reconfiguration arithmetic block to obtain the output set therefrom, (ii) for each arithmetic cell whose configuration needs not to be changed, select a corresponding piece of original configuration information from the output set, and for each arithmetic cell whose configuration needs to be changed, select a corresponding piece of alternative configuration information stored in the storage unit in place of the corresponding piece of original configuration information in the output set, and (iii) output, to the reconfiguration arithmetic block, the input set in which the one or some of the pieces of original configuration information are the selected pieces of original configuration information and the one or more pieces of alternative configuration information are the selected pieces of alternative configuration information.

2. The integrated circuit of claim 1, wherein
the control unit repeats (i) outputting a timing signal to the reconfiguration arithmetic block, (ii) obtaining a piece of original configuration information included in the output set, and (iii) selecting one of the obtained piece of original configuration information and a piece of alternative configuration information based on whether the obtained piece of original configuration information corresponds to an arithmetic cell whose configuration needs to be changed and outputting the selected piece to the reconfiguration arithmetic block.

3. The integrated circuit of claim 2, wherein
the arithmetic cells are respectively connected to the corresponding cell storage units,
the cell storage units are connected in series together to form a shift register, and
at each time when the timing signal is received from the control unit, (i) a cell storage unit located at a last end of the shift register outputs the piece of original configuration information stored therein, (ii) each of remaining storage units other than the cell storage unit located at the last end shifts the piece of original configuration information or a piece of alternative information, whichever is stored therein, to a neighboring cell storage unit in a direction of the last end, and (iii) a cell storage unit located at a first end of the shift register stores therein a piece of original configuration information included in the output set or a piece of alternative configuration information.

4. The integrated circuit of claim 3, wherein
the arithmetic cells are respectively identified by different identification numbers that are assigned serially in an order of the corresponding arithmetic cells being connected to the shift register,
the control unit (i) stores therein at least one reconfiguration target identification number which indicates an arithmetic cell whose configuration needs to be changed, (ii) holds a counter value, (iii) repeatedly outputs the timing signal, and (iv) performs repetition of, for each output of the timing signal, adding a constant value to the holding counter value, making a comparison between the added counter value and the reconfiguration target identification number, and selecting the piece of alternative configuration information when the comparison shows agreement and selecting the output piece of original configuration information when the comparison shows disagreement.

5. The integrated circuit of claim 4, wherein the control unit includes:
a reconfiguration cell address storage unit sequentially storing therein the at least one reconfiguration target identification number;
a cell address counter operable holding the counter value and operable to repeatedly output the timing signal and add the constant value to the counter value at each output of the timing signal;
an address counter operable to determine a read address in the storage unit and in the reconfiguration cell address storage unit;
a cell address comparison unit operable to make a comparison, at each time when the timing signal is output, between the added counter value and an identification number stored at the determined read address in the reconfiguration cell address storage unit; and
an information selection unit operable to repeat, for each comparison, (i) selecting the piece of alternative configuration information stored at a location indicated by the determined read address in the storage unit when the comparison shows agreement and selecting the output piece of original configuration information when the comparison shows disagreement, and (ii) outputting the selected piece to the cell storage unit located at the first end, and
the storage unit stores therein at least one piece of alternative configuration information in association with at least one piece of reconfiguration target identification number.

6. The integrated circuit of claim 5, wherein
when the comparison made by the cell address comparison unit shows agreement, the address counter sets, as a new read address, a value obtained by adding 1 to the read address.

7. The integrated circuit of claim 6, wherein
the address counter stores therein an initial address of the reconfiguration cell address storage unit, externally obtains a reconfiguration instruction requesting reconfiguration of the reconfiguration arithmetic block, and sets the initial address as the read address when obtaining the reconfiguration instruction.

8. The integrated circuit of claim 6, wherein
the address counter stores an end address of the reconfiguration cell address storage unit, and stops adding 1 to the read address when the read address is equal to the end address.

9. The integrated circuit of claim 4, wherein
the control unit stops the repetition when the counter value is equal to an identification number which indicates an arithmetic cell corresponding to the cell storage unit located at the first end.

10. The integrated circuit of claim 3, wherein
each of the cell storage units stores therein, as the piece of original configuration information, an original arithmetic parameter indicating part of the configuration of the corresponding arithmetic cell,
the storage unit stores therein, as the piece of alternative configuration information, an alternative arithmetic parameter indicating part of the configuration of the corresponding arithmetic cell, and
the reconfiguration arithmetic block rewrites an arithmetic parameter configuring each of the arithmetic cells according to one of the original arithmetic parameter included in the input set and the alternative arithmetic parameter.

11. The integrated circuit of claim 3, wherein
the reconfiguration arithmetic block and the control unit are connected by a $1^{st}$ wiring and a $2^{nd}$ wiring, and the storage unit and the control unit are connected by a $3^{rd}$ wiring,
the reconfiguration arithmetic block outputs the output set to the control unit via the $1^{st}$ wiring, and
the control unit obtains the output set via the $1^{st}$ wiring, obtains the one or more pieces of alternative configuration information via the $3^{rd}$ wiring, and outputs the input set to the reconfiguration arithmetic block via the $2^{nd}$ wiring.

12. An image processing apparatus having thereon the integrated circuit of claim 3 and causing the circuit reconfiguration apparatus to reconfigure the reconfiguration arithmetic block during one of a vertical blanking period and a horizontal blanking period.

13. An information processing apparatus having thereon the integrated circuit of claim 3 and causing the circuit reconfiguration apparatus to reconfigure the reconfiguration arithmetic block during a period in which a process by a circuit established on the reconfiguration arithmetic block does not have to be performed.

14. An integrated circuit capable of changing an internal configuration thereof, comprising:
a reconfiguration arithmetic block (i) including a plurality of reconfigurable arithmetic cells and a plurality of cell storage units each of which corresponds to a different one of the arithmetic cells and stores therein a piece of original configuration information indicating all or part of a configuration of the corresponding arithmetic cell, (ii) outputting an output set including therein pieces of original configuration information stored in the cell storage units, (iii) receiving an input set including therein one or some of the pieces of original configuration information included in the output set and one or more pieces of alternative configuration information, each of which is to replace a corresponding one of remaining pieces of original configuration information included in the output set and indicates all or part of a new configuration of a corresponding arithmetic cell whose configuration needs to be changed, and (iv) reconfiguring the arithmetic cells according to the one or some of the pieces of original configuration information and the one or more pieces of alternative configuration information included in the received input set;
an obtaining unit operable to obtain the one or more pieces of alternative configuration information; and
a control unit operable to (i) control the reconfiguration arithmetic block to obtain the output set therefrom, (ii) for each arithmetic cell whose configuration needs not to be changed, select a corresponding piece of original configuration information from the output set, and for each arithmetic cell whose configuration needs to be changed, select a corresponding piece of alternative configuration information obtained by the obtaining unit in place of the corresponding piece of original configuration information in the output set, and (iii) output, to the reconfiguration arithmetic block, the input set in which the one or some of the pieces of original configuration information are the selected pieces of original configuration information and the one or more pieces of alternative configuration information are the selected pieces of alternative configuration information.

15. A circuit reconfiguration method used in an integrated circuit capable of changing an internal configuration thereof, wherein the integrated circuit includes:
a reconfiguration arithmetic block (i) including a plurality of reconfigurable arithmetic cells and a plurality of cell storage units each of which corresponds to a different one of the arithmetic cells and stores therein a piece of original configuration information indicating all or part of a configuration of the corresponding arithmetic cell, (ii) outputting an output set including therein pieces of original configuration information stored in the cell storage units, (iii) receiving an input set including therein one or some of the pieces of original configuration information included in the output set and one or more pieces of alternative configuration information, each of which is to replace a corresponding one of remaining pieces of original configuration information included in the output set and indicates all or part of a new configuration of a corresponding arithmetic cell whose configuration needs to be changed, and (iv) reconfiguring the arithmetic cells according to the one or some of the pieces of original configuration information and the one or more pieces of alternative configuration information included in the received input set; and
a storage unit storing therein the one or more pieces of alternative configuration information, and
the circuit reconfiguration method including:
a control step of (i) controlling the reconfiguration arithmetic block to obtain the output set therefrom, (ii) for each arithmetic cell whose configuration needs not to be changed, selecting a corresponding piece of original configuration information from the output set, and for each arithmetic cell whose configuration needs to be changed, selecting a corresponding piece of alternative configuration information stored in the storage unit in place of the corresponding piece of original configuration information in the output set, and (iii) outputting, to the reconfiguration arithmetic block, the input set in which the one or some of the pieces of original configuration information are the selected pieces of original configuration information and the one or more pieces of alternative configuration information are the selected pieces of alternative configuration information.

16. A circuit reconfiguration apparatus comprising:
a reconfiguration arithmetic block (i) including a plurality of reconfigurable arithmetic cells and a plurality of cell storage units each of which corresponds to a different one of the arithmetic cells and stores therein a piece of original configuration information indicating all or part of a configuration of the corresponding arithmetic cell, (ii) outputting an output set including therein pieces of original configuration information stored in the cell storage units, (iii) receiving an input set including therein one or some of the pieces of original configuration information included in the output set and one or more pieces of alternative configuration information, each of which is to replace a corresponding one of remaining pieces of original configuration information included in the output set and indicates all or part of a new configuration of a corresponding arithmetic cell whose configuration needs to be changed, and (iv) reconfiguring the arithmetic cells according to the one or some of the pieces of original configuration information and the one or more pieces of alternative configuration information included in the received input set;
a storage unit storing therein the one or more pieces of alternative configuration information; and
a control unit operable to (i) control the reconfiguration arithmetic block to obtain the output set therefrom, (ii) for each arithmetic cell whose configuration needs not to be changed, select a corresponding piece of original configuration information from the output set, and for each arithmetic cell whose configuration needs to be changed, select a corresponding piece of alternative configuration information stored in the storage unit in place of the corresponding piece of original configuration information in the output set, and (iii) output, to the reconfiguration arithmetic block, the input set in which the one or some of the pieces of original configuration information are the selected pieces of original configuration information and the one or more pieces of alternative configuration information are the selected pieces of alternative configuration information.

17. A circuit reconfiguration method used in an integrated circuit capable of changing an internal configuration thereof, wherein the integrated circuit includes:
a reconfiguration arithmetic block (i) including a plurality of reconfigurable arithmetic cells and a plurality of cell storage units each of which corresponds to a different one of the arithmetic cells and stores therein a piece of original configuration information indicating all or part of a configuration of the corresponding arithmetic cell, (ii) outputting an output set including therein pieces of original configuration information stored in the cell storage units, (iii) receiving an input set including therein one or some of the pieces of original configuration information included in the output set and one or more pieces of alternative configuration information, each of which is to replace a corresponding one of remaining pieces of original configuration information included in the output set and indicates all or part of a new configuration of a corresponding arithmetic cell whose configuration needs to be changed, and (iv) reconfiguring the arithmetic cells according to the one or some of the pieces of original configuration information and the one or more pieces of alternative configuration information included in the received input set, and
the circuit reconfiguration method including:
an obtaining step of obtaining the one or more pieces of alternative configuration information; and
a control step of (i) controlling the reconfiguration arithmetic block to obtain the output set therefrom, (ii) for each arithmetic cell whose configuration needs not to be changed, selecting a corresponding piece of original configuration information from the output set, and for each arithmetic cell whose configuration needs to be changed, selecting a corresponding piece of alternative configuration information obtained in the obtaining step in place of the corresponding piece of original configuration information in the output set, and (iii) outputting, to the reconfiguration arithmetic block, the input set in which the one or some of the pieces of original configuration information are the selected pieces of original configuration information and the one or more pieces of alternative configuration information are the selected pieces of alternative configuration information.

18. A circuit reconfiguration apparatus comprising:
a reconfiguration arithmetic block (i) including a plurality of reconfigurable arithmetic cells and a plurality of cell storage units each of which corresponds to a different one of the arithmetic cells and stores therein a piece of original configuration information indicating all or part of a configuration of the corresponding arithmetic cell, (ii) outputting an output set including therein pieces of original configuration information stored in the cell storage units, (iii) receiving an input set including therein one or some of the pieces of original configuration information included in the output set and one or more pieces of alternative configuration information, each of which is to replace a corresponding one of remaining pieces of original configuration information included in the output set and indicates all or part of a new configuration of a corresponding arithmetic cell whose configuration needs to be changed, and (iv) reconfiguring the arithmetic cells according to the one or some of the pieces of original configuration information and the one or more pieces of alternative configuration information included in the received input set;

an obtaining unit operable to obtain the one or more pieces of alternative configuration information; and a control unit operable to (i) control the reconfiguration arithmetic block to obtain the output set therefrom, (ii) for each arithmetic cell whose configuration needs not to be changed, select a corresponding piece of original configuration information from the output set, and for each arithmetic cell whose configuration needs to be changed, select a corresponding piece of alternative configuration information obtained by the obtaining unit in place of the corresponding piece of original configuration information in the output set, and (iii) output, to the reconfiguration arithmetic block, the input set in which the one or some of the pieces of original configuration information are the selected pieces of original configuration information and the one or more pieces of alternative configuration information are the selected pieces of alternative configuration information.

* * * * *